United States Patent
Rayner

(10) Patent No.: US 9,443,366 B2
(45) Date of Patent: Sep. 13, 2016

(54) TRACKING AND CONTROL OF PERSONAL EFFECTS

(71) Applicant: TreeFrog Developments, Inc., San Diego, CA (US)

(72) Inventor: Gary Rayner, San Diego, CA (US)

(73) Assignee: TREEFROG DEVELOPMENTS, INC., San Diego, CA (US)

(*) Notice: Subject to any disclaimer, the term of this patent is extended or adjusted under 35 U.S.C. 154(b) by 465 days.

(21) Appl. No.: 13/929,717

(22) Filed: Jun. 27, 2013

(65) Prior Publication Data
US 2014/0002239 A1    Jan. 2, 2014

Related U.S. Application Data

(60) Provisional application No. 61/665,278, filed on Jun. 27, 2012.

(51) Int. Cl.
| | |
|---|---|
| G07C 9/00 | (2006.01) |
| A45C 13/18 | (2006.01) |
| G08B 13/14 | (2006.01) |
| A45C 13/24 | (2006.01) |
| G08B 21/24 | (2006.01) |

(52) U.S. Cl.
CPC ........... G07C 9/00896 (2013.01); A45C 13/18 (2013.01); A45C 13/24 (2013.01); G08B 13/1427 (2013.01); G07C 2209/62 (2013.01); G08B 21/24 (2013.01)

(58) Field of Classification Search
None
See application file for complete search history.

(56) References Cited

U.S. PATENT DOCUMENTS

| | | | |
|---|---|---|---|
| 3,184,847 A | 5/1965 | Leo | |
| 5,230,016 A | 7/1993 | Yasuda | |
| 5,505,328 A | 4/1996 | Stribiak | |
| 5,541,813 A | 7/1996 | Satoh et al. | |
| 5,648,757 A | 7/1997 | Vernace et al. | |
| 5,831,531 A | 11/1998 | Tuttle | |
| 5,907,286 A | 5/1999 | Kuma | |
| 6,304,183 B1 | 10/2001 | Causey | |
| 6,396,769 B1 | 5/2002 | Polany | |
| 6,624,752 B2 | 9/2003 | Klitsgaard et al. | |
| 7,905,530 B2* | 3/2011 | Browne et al. | B60N 3/023 296/1.02 |
| 2001/0040109 A1 | 11/2001 | Yaski et al. | |
| 2003/0102969 A1* | 6/2003 | Parsons | B62B 3/1404 340/539.13 |
| 2003/0230124 A1 | 12/2003 | Johnson et al. | |
| 2004/0246097 A1* | 12/2004 | Queenan | G07C 9/00103 340/5.61 |
| 2006/0077058 A1 | 4/2006 | Asher | |
| 2008/0191867 A1* | 8/2008 | Markovich | G07C 9/00912 340/539.13 |
| 2009/0017884 A1 | 1/2009 | Rotschild | |
| 2011/0050419 A1 | 3/2011 | Ng et al. | |
| 2012/0144885 A1 | 6/2012 | Mills | |

OTHER PUBLICATIONS

International Search Report and Opinion dated Oct. 10, 2014 in corresponding PCT/US2013/048372.

Zomm, "Zomm, The World's First Wireless Leash for the Mobile Phone, Unveiled at CES", Jan. 4, 2010, Tulsa, OK, USA, <downloaded Jan. 29, 2015 at http://www.zomm.com/blog/reviews/2010-ces-best-of-innovations-award-49>.

"Locating Luggage is Now Easier and Less Stressful", ProductNewsChannel.com, Jan. 7, 2010 (last accessed Sep. 11, 2013).

* cited by examiner

*Primary Examiner* — Brian Wilson

(57) ABSTRACT

One or more location and status monitoring tags, locks, or luggage may be used in conjunction with a monitoring or controlling device or system to indicate the whereabouts and condition of a personal effect.

9 Claims, 7 Drawing Sheets

TRACKING AND CONTROL OF PERSONAL EFFECTS

CROSS-REFERENCE TO RELATED APPLICATIONS

This disclosure claims benefit of priority, under 35 U.S.C. §119, to U.S. Provisional Application No. 61/665,278 filed Jun. 27, 2012, the contents of which are hereby incorporated by reference herein.

BACKGROUND

Knowing the location and status of personal effects can be important to a responsible person (e.g. a traveler, a commuter, a caregiver, a person wishing to efficiently go about his or her daily life activities, or the like). For the purposes of this disclosure, the term "personal effects" can include one or more items, animals, persons, or the like for which or for whom the responsible person has an ownership, possession, or other responsibility relationship. Items can include things such as luggage, backpacks, messenger bags, purses, wallets, electronic devices, such as computers, tablets, phones, and the like, small modes of transportation (e.g. bicycles or skateboards), and the like. Animals can include pets and livestock. Persons for whom the responsible person has a responsibility relationship can include any of children, adults who are afflicted by dementia, other cognitive illnesses, diseases, and the like.

In view of the foregoing, there is a need for improved devices and systems to monitor, track, and/or control various personal effects.

SUMMARY

The present disclosure describes systems, apparatuses, and methods for the monitoring, tracking, and/or controlling of personal effects, such as luggage, electronic devices, animals, and/or persons, and the like. In one aspect, a monitoring article, such as a monitoring article body includes a computer readable medium that is capable of storing identifying information regarding the monitoring article body, e.g., monitoring device, or a personal effect to which the monitoring device is attached. The monitoring article body may further include a location assessment component for determining the location of the monitoring device and producing location data, and/or may include a signaling component for performing at least one of providing information regarding the monitoring device to and receiving information and/or commands from a controlling device.

In one aspect, an apparatus, such as a monitoring article body, is provided for communicating with at least one external receiver, such as a controller, to monitor, track, and/or control one or more personal effects. For instance, in one instance, the instant technology provides a monitoring article body, such as a tag, for tracking a personal effect wherein the personal effect may include one or more of a structure for transferring goods, such as those commonly known as luggage, for example, backpacks, messenger bags, purses, wallets, and the like. Other types of personal effects may include electronic devices, such as computers, tablets, phones, and the like. More types of personal effects that may be monitored, tracked, and/or controlled in accordance with the technologies described herein may include small modes of transportation such as bicycles, skateboards, scooters, skates, and the like. Additional personal effects that may be monitored, tracked, and/or controlled may include animals such as pets and livestock. The devices, methods, and systems described herein may also be deployed to monitor and/or track persons, such as children and/or adults.

In a particular instance, a monitoring article apparatus, such as a monitoring tag may be employed in addition so as to monitor, track, and/or control a personal effect such as luggage. Although the following disclosure is set forth herein below in connection with monitoring, tracking, and/or controlling a particular personal effect, such as luggage, it is understood that this is simply for the sake of ease of understanding and the pertinent disclosure may be applicable to monitoring, tracking, and/or controlling other types of personal effects such as those described herein above and throughout this disclosure. Accordingly, in one instance, a tag for monitoring, tracking, and/or controlling a personal effect, such as luggage, is provided. The luggage may be any type of luggage such as that commonly known in the art, and in some instances may include a securing mechanism, such as a securing mechanism used to secure the luggage and/or the contents therein.

In certain instances, the tag may include and/or communicate with a locking mechanism, such as a locking mechanism that may be attached to the securing mechanism, e.g., a zipper or other such securing mechanism, of the luggage, or a securing mechanism that is integral to the luggage itself. In particular instances, the locking mechanism may include one or more actuators. The tag may include one or more data inputs capable of receiving data from one or more corresponding data collecting sources that may be in communicative association with the personal effect, e.g., the luggage, and may include one or more control outputs capable of outputting a control signal, such as to the one or more actuators. The tag may further include one or more additional components, including but not herein limited to: one or more wireless communication modules, such as for wireless data communication, for instance, with at least one external controller; a non-transient storage device such as for storing instructions; and/or a processor responsive to the instructions. The processor may be any suitable processor that is capable of being responsive to the instructions from the controller and/or capable of receiving the data from the one or more data inputs; and/or generating a control signal for one or more control outputs; and/or generating wireless data communication for the at least one wireless data communication module which data may be based on the data from the one or more data sources and/or the data communicated by the control signal from the one or more control outputs.

In another aspect, an apparatus, such as a monitoring article body, is provided for communicating with at least one receiver, such as a controller, to monitor, track, and/or control one or more personal effects, wherein the monitoring controlling body includes a locking mechanism, in some instances, the locking mechanism functioning to secure a compartmented article in a closed or open position. For instance, in some instances, the locking mechanism, referred to herein for convenience as a lock, may be any mechanism capable of functioning to secure an item in an open or a closed configuration. Accordingly, in various embodiments, the locking mechanism may be any suitable lock known or to be known in the art that is capable of being adapted so as to function in the prescribed manner set forth herein. In certain instances, the lock is adapted to traverse from a closed or locked configuration to an opened or unlocked configuration, wherein access to a compartmented space is controlled. In various instances, the lock is further adapted so as to be capable of being attached to a personal effect, such as a personal effect disclosed herein.

Suitable locks may be a variation of a mechanical lock, such as a pad lock, for instance, a pad lock that unlocks using a combination or a key; a magnetic lock; an electronic lock; an inductive or conductive lock; and the like. Hence, in particular instances, the lock may include a disk and tumbler for unlocking the lock; rotating segments which, when aligned in a specific order, unlock the lock; magnetic or electronic circuits that are capable of effectuating the locking and/or unlocking of the lock in response to the presence or flow of magnetic and/or electronic fields, such as through conduction and/or induction. Such locking mechanisms may be manipulated and/or controlled by the application of a key, which key may be a mechanical or virtual key that locks and/or unlocks in response to a combination, such as an alpha-numeric combination, numeric combination, or the use of symbols as a combination. In certain instances, a suitable locking mechanism may be configured so as to function in a manner that locks two moveable members in place relative to one another, such as in a closed, open, or semi-opened, e.g., angled, relationship to one another. In other instances, a suitable locking mechanism is configured for securing two items, such as two items moveable in relation to one another, together, such as in a fixed or semi-fixed position, e.g., relative to one another.

In certain embodiments, the locking mechanism, e.g., a lock, may include one or more additional components including, but not limited herein to: a memory, a location assessment component, and/or a signaling component, as described in greater detail below. Accordingly, in various instances, the locking mechanism has an unlocked state and a locked state, wherein the locked and unlocked state is capable of being responsive to a control signal from one or more control outputs. For instance, the locking mechanism may be associated with an item wherein the item includes a lockable compartment, and the locking mechanism is connected with one or more of the bounding members of the compartment to secure the compartment in the locked or unlocked state, and regulate and/or control access to the compartment, such as in the unlocked state. Hence, as described herein, in certain instances, a user may wish to use a location and status monitoring device that is a lock, to secure a personal effect, such as when the personal effect, or other such item, has a means to be opened and closed and further can be secured in such open or closed configuration with a locking mechanism, such as where the personal effect is a piece or pieces of luggage, a money containment system, e.g., a purse or money box, a food container, and the like. In certain instances, the use of a locking location and status device, as disclosed herein, may be desirable in order to aid in preventing removal of the location and status device from an item to which the locking device is attached, regardless of whether the item is locked closed by the device, for instance, the locking mechanism may be configured so as to be used to secure two or more items together, without regard to whether the items themselves are capable of being opened or closed. In such an instance, the locking mechanism may be configured to associate with an auxiliary securing mechanism such as a strap, a rope, a chain, etc. and the like.

In a further aspect, an apparatus, such as a monitoring article body, is provided for communicating with at least one receiver, such as a controller, to monitor, track, and/or control one or more personal effects, wherein the monitoring controlling body includes a piece or pieces of luggage, in some instances the luggage having a securing and/or locking mechanism to secure the luggage and/or the contents therein. The apparatus may include one or more data inputs to receive data from one or more corresponding data sources associated with the luggage, and/or one or more control outputs to output a control signal to corresponding one or more components, such as actuators associated with the securing and/or locking mechanism. The apparatus may also include at least one wireless communication module for wireless data communication with the at least one external controller, and/or may include a non-transient storage device such as for storing instructions. The apparatus may also include a processor, such as a processor described herein, responsive to the instructions to perform one or more of the following: receive data, such as from one or more data inputs; generate the control signal for the one or more control outputs; and/or generate the wireless data communication for the at least one wireless data communication module such as that based on the data from the one or more data sources and/or the control signal from the one or more control outputs.

In some embodiments of the foregoing aspect, the securing mechanism may be any form of securing mechanism, such as those commonly known in the art to secure the contents within the luggage therein, such as a zipper, and the like, wherein the securing mechanism may further include a locking mechanism, such as a locking mechanism that has an unlocked state and a locked state. In various instances, the unlocked state and the locked state of the locking mechanism may be configured, as described herein, so as to be responsive to a control signal from one or more control outputs. Accordingly, in some instances, the luggage includes a securable and lockable compartment, and the locking mechanism is connected with the compartment to secure the compartment in the locked state, and allow access to the compartment in the unlocked state. In some embodiments, the luggage includes at least one wheel and/or at least one extendable handle, and the locking mechanism includes a wheel and/or handle stop associated with the at least one wheel and/or handle respectively, wherein the wheel and/or handle stop functions to lock the at least one wheel and/or handle, respectively, in the locked state, and unlocking the at least one wheel and/or handle, respectively in the unlocked state.

In some embodiments, a tag, locking mechanism, and/or transportable or non-transportable compartmented space, e.g., piece or pieces of luggage, may be configured for being modulated, tracked, and/or controlled, such as by communicating with an external controlling device. Accordingly, in certain instances, the tag, locking device, and/or luggage, disclosed herein, may include one or more of a wireless communication module, which may include a transmitter and/or receiver, such as for wireless data communication, for instance, with at least one external controller; a non-transient storage device such as for storing instructions, e.g., a memory; a location assessment component, e.g., a GPS device; a status module, such as for generating and/or receiving data from a data generating device, and further for determining the condition and/or status of the device or a personal effect to which the monitoring article body is associated with, or is otherwise in communication therewith; a signaling component; and/or a processor capable of controlling various functions of the tag, locking mechanism, or luggage and/or further being responsive to instructions, such as instructions from a controlling device.

Accordingly, in certain instances, the processor may be any suitable processor that is capable of being responsive to instructions from a controller and/or capable of receiving data from one or more data generating and/or inputting devices; and/or generating a control signal for one or more control outputs; and/or generating wireless data communication for the at least one wireless data communication module which data may be based on the data from the one or more data sources and/or the data communicated by the control signal from the one or more control outputs. In some instances, the one or more data sources associated with the luggage include a geolocation data source. In some embodiments, the one or more data generating sources associated or otherwise in communication with the monitoring article body may include one or more environmental sensors. In some instances, the one or more environmental sensors may include one or more of a temperature sensor, a humidity sensor, a moisture sensor, a light sensor, a velocity sensor, an orientation sensor, a movement sensor, an accelerometer, an air pressure sensor, a camera and/or a microphone, and the like. Accordingly, in certain instances, the wireless data communication from the wireless data communication module may include a notification representing a change in state of data from the one or more data sources. In some embodiments, the notification may include an alert formatted so as to be communicated to the at least one external controller. In some embodiments, the alert is related to a geographical position of the monitoring article body and may include one or more reports as to its current, historic, or predicted future status.

In another aspect, a system is provided that includes a monitoring article body, such as a tag, lock, or luggage, having a securing mechanism to secure the monitoring article body, e.g., tag, lock, or luggage, and a location and/or status monitoring subsystem that can be in communication with the monitoring article body, e.g., luggage. The location and/or status monitoring subsystem may include one or more data input mechanisms configured so as to receive data from associated or otherwise corresponding one or more data sources in communication with the monitoring article body, e.g., tag, lock, or luggage, and one or more control outputs to output a control signal to a corresponding one or more actuator associated with the securing mechanism. The system may include one or more of: one or more wireless communication modules configured for wireless data communication with one or more external controllers; a non-transient storage device configured for storing instructions; and/or a processor responsive to instructions and/or capable of generating command operations, which command operations may be controlled by the controller and effectuated by one or more operator mechanisms. Accordingly, the processor may be configured to be responsive to the instructions and/or data it receives from the controller and/or one or more data inputs; configured for generating control signals for the one or more control outputs; and generating wireless data communications, such as for the at least one wireless data communication module, which may be based on the data from the one or more data sources and/or the control signal from the one or more control outputs, such as from the controller.

In some embodiments, such as of the foregoing aspect, the system may further include an application program for being run on the at least one external controller. The application program may be configured to: receive wireless data communication from a wireless communication module such as of the location and status monitoring subsystem; and to generate a visual and/or audible notification, for example based on wireless data communication, such as that received from a wireless communication module. In some embodiments, the application program may be run on the at least one external controller and may be configured to generate and transmit one or more external control signals to monitor, modulate, and/or control the monitoring article body. For instance, where the monitoring article body is a locking mechanism and/or a piece of luggage, the application program may be configured to monitor and/or lock the securing mechanism of the luggage.

In some embodiments, the one or more data generating sources may include a geolocation data source. The data generated by the geolocation data source may include geolocation data, and the wireless data communication from the wireless communication module may include generated geolocation data.

In some embodiments, the securing mechanism may be configured as and/or may include a locking mechanism having an unlocked state and a locked state. The unlocked state and the locked state of the locking mechanism therefore may be configured for being responsive to the control signal from the one or more control outputs. In some embodiments, the monitoring, tracking, and security subsystem may include a housing to house one or more of at least part of the one or more data inputs, at least part of the one or more control outputs, the at least one wireless communication module, the non-transient storage device storing instructions, the at least one data generating sensor module, and the processor. In some embodiments, the luggage includes a compartment, and the securing mechanism includes locking mechanism to lock and/or unlock the compartment based on the one or more external control signals from the application program running on the at least one external controller.

In some embodiments, the luggage includes at least one wheel and/or a translatable handle, and the securing mechanism includes a locking mechanism to lock and/or unlock the at least one wheel based on the one or more external control signals from the application program running on the at least one external controller. In some embodiments, the luggage includes a handle, and the securing mechanism includes a locking mechanism to lock and/or unlock the handle based on the one or more external control signals from the application program running on the at least one external controller. In some embodiments, the luggage includes an alarm responsive to the one or more control signals from the application program running on the at least one controller. The alarm may indicate when the wheels are moving, non-moving, and/or locked or unlocked; when the handle is extended, non-extended, and/or locked or unlocked; and/or when the luggage enters or leaves a zone proximate to the controlling device.

Further, as described above, in yet another aspect, the instant technology may provide a tag for luggage, which additionally may have a securing mechanism, e.g., a closure, such as a zipper, to secure and otherwise participate in the closing of the luggage. Such a tag, in various embodiments, may include a locking mechanism for attaching to the securing mechanism of the luggage or may communicate with such a locking mechanism, and the locking mechanism may include at least one locking element, such as an actuator. The tag and/or associated locking mechanism may include one or more data inputs to receive data from one or more data sources associated or otherwise in communication with the luggage, and may include one or more control outputs to output a control signal to the at least one locking element or actuator. The tag and/or associated locking element may include: at least one wireless communication module for wireless data communication with at least one external controller; a non-transient storage device storing instructions; and a processor responsive to the instructions.

Such a processor may be configured for being responsive to the instructions to: receive the data from the one or more data inputs; generate the control signal for the one or more control outputs; and generate wireless data communication for the at least one wireless data communication module based on the data from the one or more data sources and/or the control signal from the one or more control outputs.

In some embodiments of the foregoing aspect, where the tag and/or associated locking mechanism is attached to or is otherwise in communication with a mobilized compartment for the storage of goods, such as luggage, the luggage may include a bounded space, such as a storage compartment, which storage compartment may be configured for being opened and closed, and further may be configured for being secured or otherwise locked in a closed and/or opened configuration. Accordingly, such luggage may include securing mechanism that in turn includes an engagement mechanism. In such embodiments, the securing and/or locking mechanism may include a locking element, such as an actuator, that is configured to lock and/or unlock the engagement mechanism based on a control signal received from or otherwise transmitted by a controller. In some embodiments, such luggage may include at least one wheel and a securing mechanism, which may be in addition to the aforementioned securing mechanism, may include a wheel stop, where said actuator may be configured to activate, e.g., lock and/or unlock, the wheel stop based on a received control signal. In some embodiments, the luggage includes an extendable and retractable handle and may further include a securing mechanism wherein the securing mechanism includes a handle lock, wherein the actuator is configured to activate, e.g., lock and/or unlock the handle lock based on a received control signal. Accordingly, in such embodiments, the at least one wireless communication module is configured to receive an external control signal from the at least one external controller, and the actuator of the locking mechanism of the tag and/or associated locking mechanism is responsive to the external control signal.

In some embodiments, the one or more data sources associated with the compartmented containment device, e.g., luggage, may include one or more environmental sensors. In some embodiments, the one or more environmental sensors may include one or more of a temperature sensor, a humidity sensor, a moisture sensor, a light sensor, a velocity sensor, a movement sensor, an accelerometer, a directionality sensor, a pressure sensor, a camera, a microphone, a speaker, and other sensors capable of generating data, e.g., electronic data, and communicating the same to a controller. Accordingly, in some embodiments, the wireless data communication by the at least one wireless data communication module includes a notification representing a change in state of data from the one or more data sources. In some embodiments, the notification includes an alert formatted for the at least one external controller and/or an alert formatted for an associated tag and/or associated locking mechanism. In some embodiments, such a tag and/or locking mechanism may include a housing to house at least part of the one or more data inputs, at least part of the one or more control outputs, the at least one wireless communication module, the non-transient storage device storing instructions, and the processor.

In yet another aspect, an apparatus is provided for communicating with at least one external controller to control a personal effect, such as luggage, the personal effect being configured for associating with a securing mechanism, which securing mechanism functions to secure the personal effect in a given state and/or configuration. The apparatus may include an input device that receives status data from one or more data sources associated with the personal effect, and a wireless communication device that communicates the status data with an external controller. The wireless communication device may be configured to receive and/or transmit one or more instruction signals from or to, respectively, the external controller. The apparatus may also include a processing device that receives and processes the status data from the input device, and may further generate a control signal for controlling one or more control or secure features associated with the personal effects, such as a securing mechanism of luggage, the control signal being based on the status data from the one or more data sources and/or instruction signals received from the external controller. The apparatus may also include an output device that outputs a signal such as in response to data obtained from one or more data generating sensors and/or in response to the control signal, received from the controller, which output signal may be employed to communicate with an associated securing and/or locking mechanism such as to control the securing mechanism of the personal effect in a given state and/or configuration.

In some embodiments of the foregoing aspect, the securing mechanism includes or is otherwise in communication with a locking mechanism having a locked and an unlocked state, the unlocked state and the locked state of the locking mechanism being actuated in response to a control signal received from an output device, such as an output device associated with an external controller and/or tag, as disclosed herein. In some embodiments, such as where the personal effect includes a lockable compartment, and the locking mechanism may be connected with the bounding members of the compartment to secure the compartment in the closed or opened locked state, and to further allow access to the compartment in the unlocked state.

Further, in some embodiments of the foregoing aspect where a data source is included, the one or more data sources associated with the personal effect may include a geolocation data source. In some embodiments, the one or more data sources associated with the personal effect may include one or more environmental sensors. In some embodiments, the one or more environmental sensors may include one or more of a temperature sensor, a humidity sensor, a moisture sensor, a light sensor, a velocity sensor, a movement sensor, an accelerometer, a directionality sensor, a pressure sensor, a camera, a microphone, a speaker, and other sensor capable of generating data, e.g., electronic data, and communicating the same to an output device and/or a controller. In some embodiments, a wireless data communication module may further be included wherein the module is configured for communicating wireless data, such as data generated by such an environmental sensor, to a controller wherein the wireless data communicated by the at least one wireless data communication module may include a notification representing a change in state of data from the one or more data sources. In some embodiments, the notification may provoke an alert formatted for the at least one external controller. In some embodiments, the alert is related to a geographical position or environmental status of the personal effect.

DETAILED DESCRIPTION

Figure 1:
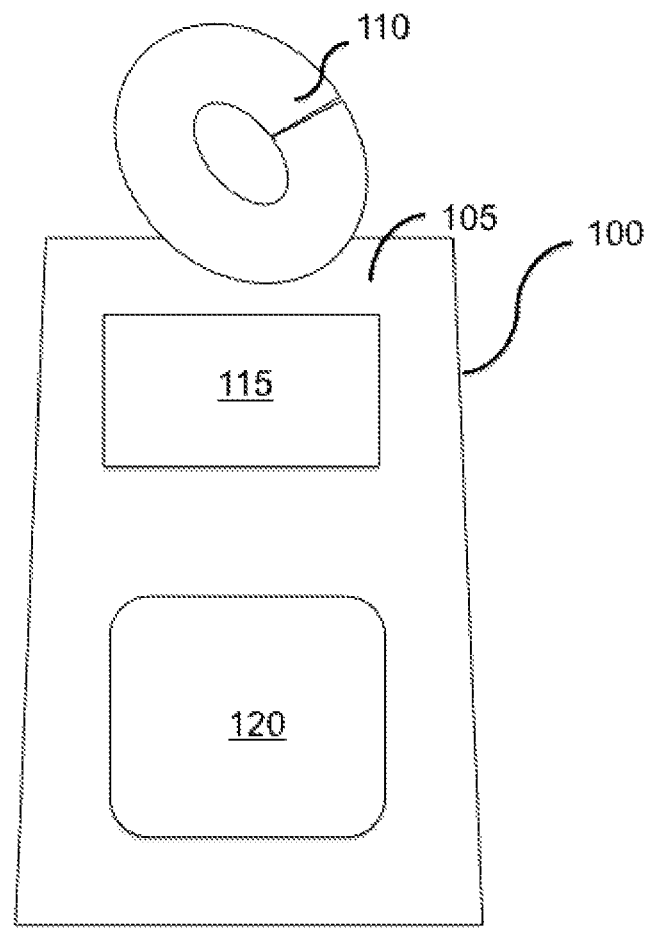
FIG. 1 shows a schematic of an exemplary location and status monitoring tag.

The ability to keep track of personal effects utilizing a readily available device, such as for example home or laptop computer or a small handheld electronic device, for instance, a mobile computing device, such as a tablet computer or mobile smart phone, or the like, can be desirable for modulating, tracking, and/or controlling the personal effect thereby easing the mind of a person responsible for the personal effect. Current location and status monitoring systems are often cumbersome, not capable of being handheld, and can typically require a unique monitoring device for each type of personal effect and/or environmental status thereof, and may actually discourage users from fully utilizing such a system once implemented.

Implementations of the current subject matter can include one or more features relating to location and status monitoring devices, systems, methods, and the like for modulating, controlling and/or tracking the location and/or status of at least one personal effect. The current subject matter is primarily described herein in the context of personal effects such as luggage. However, it should be appreciated that the current subject matter can be used in a simpler configuration, such as with a location and/or status monitoring tag or lock. The current subject matter can, in some implementations, be realized as one or more location and/or status monitoring devices that communicate with one or more controlling devices, such as home or mobile computing devices, to allow a user to have knowledge of the whereabouts and condition of one or more personal effects.

When a user has a personal effect that is to be monitored, tracked, and/or controlled, it can be desirable for the user to know, or to be able to find out with minimal effort, one or more of where the personal effect is, what state it is in, how it is being or has been handled or treated, and the like. As an illustrative example, when traveling, a user might like to know when luggage or another personal effect leaves his or her vicinity prior to checking-in or stowing the items. The user might also like to know what is happening or what has happened to the personal effect when it is out of his or her sight, such as whether or not it is opened or unlocked, dropped, placed under something heavy, exposed to extreme temperatures, ultraviolet light, exposed to moisture, and the like.

Tags for Monitoring Personal Effects

In accordance with the above, in one aspect, a location, control, and/or monitoring device may be provided wherein the location, control, and/or status monitoring device may be configured as a tag that attaches or affixes to a personal effect. A suitable tag may be fabricated from any suitable material such as a plastic, a metal, a ceramic, a cloth, a natural plant-based material, a composite material, or any combination thereof. A natural plant-based material may be bamboo, wood, resin, or the like. A composite material may include glass reinforced polymer composites, carbon fiber reinforced polymer composites, polyamide-fiber reinforced polymer composites, metal reinforced ceramic composites (cermets), and the like. In certain embodiments, the tag may be fabricated from metal, such as aluminum, steel, copper, bronze, silver, gold, platinum, a combination thereof and the like; or a rigid or semi-rigid plastic, such as a thermoplastic elastomer, polypropylene, PVC, polycarbonate; or a rubber in accordance with fabrication processes well known in the art such as machining, welding, casting, molding, and the like. Accordingly, such a tag may be formed using one or more of heat or chemical welding, die casting, injection molding, sewing, riveting, vacuum molding, spin coating, hand lay-up, mechanical or electronic machining, and the like. In some implementations, a tag may be of any suitable shape and of any suitable size dependent on the shape and size of the personal effect to be monitored, modulated, tracked, and/or controlled. For instance, a suitable tag may be circular, tubular, conical, triangular, pyramidal, square, rectangular, a cube, etc. Further, the dimensions may be of any suitable extension. Such as having a length from about 1 or 2 feet or about 5 feet or more, to about 1 or 2 cm or less, including about 10 or 8 inches to about 5 to 10 centimeters, such as from about 6 or 4 inches to about 1 or 2 inches or the like. Such as having a width from about 1 or 2 feet or about 5 feet or more, to about 1 or 2 cm or less, including about 10 or 8 inches to about 5 to 10 centimeters, such as from about 6 or 4 inches to about 1 or 2 inches or the like. Such as having a thickness from about 10 or 12 inches or about 15 inches or more, to about 1 or 2 mm or less, including about 8 or 6 inches to about 5 to 8 mm, such as from about 4 or 3 inches to about 2 or 1 inches, including about 2 cm to about 1 cm or less. For example, in one instance, a suitable tag, such as for use with a personal effect such as luggage, may have the following exemplary dimensions 3 or 4 cm by 3 or 4 cm square (or rectangular). In some implementations, a suitable tag may be larger than or equal to a 3 cm by 3 cm square. In some implementations, a tag may be smaller than a 3 cm by 3 cm square.

A user may wish to use a tag when tracking, controlling and monitoring a transportable compartmented article, such as a piece of luggage, and in some embodiments a user may wish to use a tag when tracking and monitoring a person, such as a child, in a crowded or unconfined area, such as park. Such a tag may be worn as a bracelet or necklace, or be attached to a piece of clothing. A tag may also be attached to a pet collar for tracking or monitoring an animal such as a pet. A tag may be attached to a housing or a container for electronics, such as an electronic device, for example a camera or laptop or tablet computer or a mobile computing device. In addition, a tag may be used with a purse, a school bag, athletic equipment while at a competition, or the like. In some embodiments, a tag may be affixed to a personal effect by any suitable attachment mechanism or combination of mechanisms known to those of skill in the art. Exemplary mechanisms of attachment include, but are not limited to: an adhesive, such as a sticky backing; a magnet, or an attachment component, such as a loop, clip, ring, tether, leash, or hook and loop fabric (e.g. Velcro™).

FIG. 1 is a schematic diagram representing one implementation of a location and status monitoring and/or controlling device that is configured as a tag 100. The tag 100 includes a tag body 105. The tag body 105 can include visible identifying information regarding the personal effect associated with it and/or its ownership and can optionally include some or all of such information encoded as data that can be read optically (e.g. in the form of a bar code or QR code or the like) or as data in a machine-readable memory that can be exchanged with a compatible device via one or more wireless or wired communication modes. The tag 100 can be attached to a personal effect through an attachment component 110. The attachment component 110 may optionally include one or more of a ring, a strap, a belt, a loop, a band, a cable, an adhesive, or the like, or any combination thereof. Those having ordinary skill in the art will appreciate other attachment schemes. The tag body can also include a location assessment component 115 and a signaling component 120 for providing information regarding the article to a controlling device, and a memory 125 for recording a status detected by the tag 10. The tag may additionally include features that signal an alarm and/or a visual feature such as a feature that lights up in one or more colors and/or in one or more sequences thereof in accordance with a random or predetermined pattern, such as when the tag comes into or goes out of the proximity of a controller device.

Lock for Monitoring and Protecting Personal Effects

The location, control, and/or status monitoring device may also be a lock that attaches to a personal effect. A lock may be a variation of a pad lock, such as a pad lock that unlocks using a combination or a key, but with additional components including a memory, a location assessment component, and a signaling component, as described in greater detail below. A lock may include a disk and tumbler for unlocking the lock. Alternatively, the lock may include rotating segments which, when aligned in a specific order, unlock the lock. Such combination locks may use alphanumeric combinations, numeric combinations, or symbols as a combination. In certain instances, the lock may be an electronic, conductive, inductive, and/or magnetic lock. A lock may be fabricated from a metal, a plastic, a ceramic, a composite, or any combination thereof. A user may wish to use a location, controlling, and/or status monitoring device that is a lock when the personal effect, or item, has a means to be closed which can be secured with a lock, such as a purse or money box, or when two or more items need to be coupled together in a locked position. In other instances, a locking location, controlling, and/or status device is desirable in order to aid in preventing removal of the location and status device from the item, regardless of whether the item is locked closed by the device.

Figure 2:
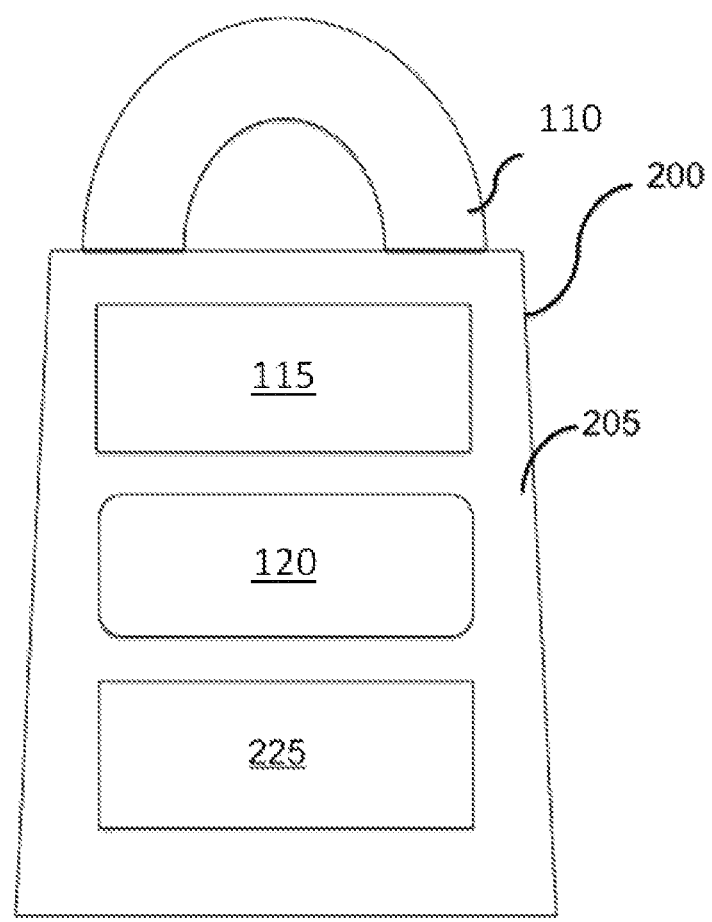
FIG. 2 shows a schematic of an exemplary location and status monitoring lock.

FIG. 2 is a schematic showing one implementation of a location, controlling, and/or status monitoring device implemented to include a locking mechanism. The location, controlling, and status monitoring device 200, has a lock body 205 that is attached to a personal effect through an attachment component 110. In FIG. 2, the attachment component 110 is shown as a loop or partial ring. The lock body 205 can include visible identifying information regarding the personal effect associated with the lock, such as luggage or the like, or information about the lock itself and can optionally include some or all of such information encoded as data that can be read optically (e.g. in the form of a bar code or QR code or the like) or as data stored in the memory or in another machine-readable memory that can be exchanged with a compatible device via one or more wireless or wired communication modes. The lock body 205 further includes a location assessment component 115, a signaling component 120 for providing information regarding the article to a controlling device, and a memory 225 for recording the locked/unlocked status switching of the locking mechanism. The tag may additionally include features that signal an alarm and/or a visual feature such as a feature that lights up in one or more colors and/or in one or more sequences thereof in accordance with a random or predetermined pattern, such as when the tag comes into or goes out of the proximity of a controlling device.

Luggage for Monitoring Personal Effects

In various aspects, the location, controlling, and status monitoring device may be included with a piece or pieces of luggage that surrounds a personal effect or which is itself the personal effect. The luggage may include one or more pieces of luggage, and may include a trunk, a valise, a suitcase, a hat box, a steamer box, an electronics case, a duffle bag, an overnight bag, a purse, a tote bag, a garment bag, a knapsack, a rucksack, a backpack, a briefcase, an attaché case, a sporting goods bag, a cooler, a lunch box, a jewelry case, a toiletries case, a gym bag, a pet crate, a sporting goods bag, or the like. The sporting goods bag may include a golf bag, a surfboard case, a bowling bag, a tennis racket bag, or the like. Many materials may be used to fabricate the luggage. Materials used to fabricate luggage may include a textile, a polymer, a metal, a plastic, a composite, a fabric, a foam, a rubber, a ceramic, a natural plant-based material, or any combination thereof. A natural plant-based material may be bamboo, wood, resin, or the like. A composite material may include glass reinforced polymer composites, carbon fiber reinforced polymer composites, polyamide-fiber reinforced polymer composites, metal reinforced ceramic composites (cermets), and the like. Such materials may include a framework material, such as that composed of a metal frame or plastic frame, such as a steel or aluminum or polycarbonate or PVC or polypropylene frame, which frame may further be associated with a covering such as a material covering such as canvas, or other woven material and the like. A user may wish to use the luggage to track and monitor a personal effect when the item to track is unwieldy or difficult to attach a tag to, such as a bowling ball. Also, a user may wish to use the luggage for tracking and monitoring many smaller items together, such as clothes, papers, or jewelry. The luggage is also useful for tracking and monitoring items that need to be protected in travel, such as cameras or other electronic equipment. In some implementations, the device is built into the luggage itself, e.g. integrated into the walls, wheels, or handles of such luggage. In other implementations, the device may be a modular device that can be removably attached to the luggage.

Figure 3:
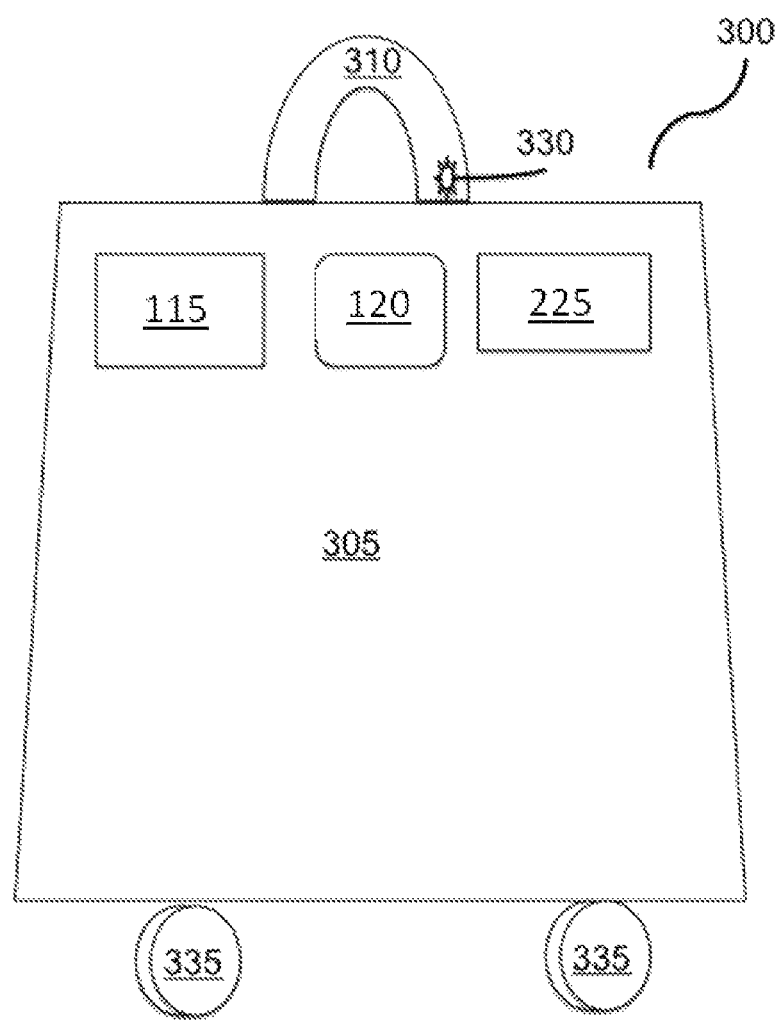
FIG. 3 shows a schematic of an exemplary location and status monitoring luggage.

FIG. 3 is a schematic showing an implementation of a location and status monitoring device as a suitcase or luggage. The luggage 300 has a luggage body 305. A user may pull the luggage 300 by a handle 310 that is attached to the luggage body 305. The luggage body 305, the handle 310, or some other part of the luggage can include a location assessment component 115, a sensing and/or signaling component 120 for providing information regarding the article to a controlling device, and a memory 225 for recording the locked/unlocked status switching of the locking mechanism and/or any other status information gathered by additional features or sensors. Wheels 335 are attached to the luggage body 305 and may be used both as a way to aid or impede movement of the luggage 300 and to recharge a rechargeable battery.

Controlling Device

Implementations of location, control, and status monitoring devices consistent with the subject matter described herein can optionally communicate with a controlling device and possibly one or more other location, control, and status monitoring devices to alert a user to the location of the location, control, and status monitoring device. The controlling device can optionally be a standalone, dedicated device such as a device solely or at least primarily dedicated to communicating with and/or controlling the location, control, and status monitoring devices; or the control device may be a general purpose communication device (e.g. a home or portable computing device, such as a smartphone, a tablet computer, a laptop computer, a mini-tablet device, or the like). The controlling device may be a single device or the user may switch between two or more controlling devices. In some implementations, features and functions described elsewhere herein as part of a controlling device can be provided by one of a plurality of devices associated with multiple personal effects. For example, the personal effects disclosed herein, e.g., tags, locks, luggage, etc. can optionally include a processor and communications hardware that can permit the personal effect to communicate with, and in some embodiments to act as, the controlling device.

Detection of Location and Proximity by Tags, Locks, and Luggage

In some examples, a user may require location data, or proximity information, and/or status data regarding his or her personal effect(s). The user may wish to know if the personal effect is at a certain location, or within a certain radius of a controlling device that is synched or otherwise linked via one or more wireless communication protocols to a location monitoring device associated with the personal effect, and/or to know the status of one or more conditions of the personal effect, as described in greater detail below. In certain of such examples, the controlling device may, e.g., on a pre-determined schedule or intermittently, be programmed to expect a wireless communication signal from the location and/or status monitoring device that is associated with a personal effect and in potential communication with the control device. Consistent with the present disclosure, the controlling device and/or location and/or status monitoring device may emit an alarm or warning if such a signal is present after a period of being absent, or absent after a period of being present. Additionally, the controlling device and/or location monitoring device may emit a signal, such as a visual indication or vibratory warning when such a wireless communication signal from the location and/or status monitoring device is detected, after a period of absence, or not detected, after a period of presence. The wireless communication signal may be arbitrarily received or may be received in response to a communication sent to the controlling device. The communications may use one or more communication protocols such as variants described in the IEEE 802 standard, or proprietary wireless communication techniques. For example, the controlling device and location monitoring device may use variants and/or combinations of wireless communications signals, such as Bluetooth®, ANT, Wi-Fi, cellular data (e.g., LTE), etc.

In some implementations, the controlling device may instead locate the location monitoring device using longer-distance wireless communication schemes, by comparing absolute locations of the controlling device and the location monitoring device. Absolute or near absolute location data may be obtained or derived by detecting and analyzing signals from a Global Navigation Satellite System (GNSS), such as the Global Positioning System (GPS). Signals from other known-location transmitters, for example cell phone signal towers, may be used in place of, or to augment GNSS signals. In some implementations, the controlling device may transmit to and/or receive location information from the location/status monitoring device by use of wireless data networks, such as Wi-Fi, or cellular data networks, or wireless direct communications. Such wireless communications over a network may utilize dynamically assignable addresses such as one or more of those used in TCP/IP protocols, the controlling device may use IP and/or typically more-persistent and device-specific MAC addresses for direct controller-to-location/status device communication, or for network communication via a routing device. The signal strength of a radio signal communicated between the controlling device and the location and status monitoring device may also be used to determine the distance between the luggage and the controlling device.

Determining the geolocation of the location and status monitoring device may be aided with the addition of a magnetic compass or magnetometer that detects changes in direction of the monitoring device, which components may be part of the controller and/or status monitoring device, e.g., the tag, lock, and/or luggage. Determining the location of the location/status monitoring device may be accomplished using the location/status device itself, which can house a power source, such as a battery, and a circuit board with a processor. Alternatively, the device may transmit the location data to the controlling device, and the controlling device can analyze the location data to determine the location of the location/status monitoring device. In another implementation, the location data collected by the monitoring device may be stored on the device, and then accessed at a later time for analysis to determine locations of the monitoring device over time. Preferably, the monitoring and/or status, and/or controlling device can determine and/or store the date and time and/or condition of the device when location data is collected.

The controlling device may also utilize a known location of the location and status monitoring device, compare this known location to its own known location, and issue a warning or emit an alarm when the location and status device is farther away from the controlling device than a predetermined threshold distance or is within a predetermined proximity of the controlling device. The location, control, and status device, such as a tag, a lock, or luggage, etc., may issue a warning or emit an alarm or other signal when the location, control, and status device is farther away from the controlling device than a predetermined threshold distance or is within a predetermined proximity of the controlling device, such as an electronic device such as a mobile computing device, tablet computer, or mobile phone. For instance, a location, control, and status device, such as a tag, lock, or luggage may be configured for lighting up when it approaches a user holding the controlling device, and/or vice versa, i.e., the control device may be configured for lighting up, vibrating, sounding an alarm or otherwise signaling when the location, control, and/or status monitoring device approaches the controller. An alarm can include, but is not limited to, an audio alarm, a visual alarm, a vibratory alarm, a haptic signal, a message sent to another device, or any combination thereof.

Besides being notified of the proximity or distance between the controlling device and the location, control, and status device, a user may wish to actively track the movement of the location, control, and status device in real-time. The controlling device may have the ability to actively track the location of the location, control, and status device, such as on a map of the area surrounding a user or the area surrounding the location/control/status monitoring device. The controlling device may alternatively have the ability to actively track the location of the location, control, and status device such as by indicating the time and the distance between the user and location, control, and status device on a chart or table. Such active tracking may be accomplished via a dedicated software application on the controlling device and/or tracking device, a software application running on remote server, or via a website.

In some implementations, the location, control, and status monitoring device may communicate directly or indirectly with a server via a private or public network (e.g., the Internet). For example, an airport or airline, shopping mall, town, or city may provide communication nodes or relays at strategic locations for collecting information about/from a location and status monitoring device. The node/relay may detect a location, control, and status monitoring device and report such detection to a computer server. In some instances the node or relay may obtain information specifically identifying the location status monitoring device, along with its status. A location of the location and status monitoring device may be derived with respect to proximity of the node/relay, or may be reported from the location and status monitoring device to the node/relay. The identifying information may be recorded at the node/relay for future use, or may be forwarded to a computer server for any of several purposes.

For example, location and/or status information obtained by the node/relay may permit statistical evaluation of tag, lock, baggage location and status to aid an airport, airline, travel security agency or the like in addressing inefficiencies, evaluating location or status history, e.g., for a suspicious bag, or the like. Such a system may be employed by towns and/or cities to monitor locations and/or status of other personal effects including animals and/or persons. Moreover, specific obtained location, control, and/or status information may be presented on an access-controlled website for access by an enrolled private owner of the location, control, and status monitoring device. In certain instances, the provider of the information may require a user to subscribe to a service in order to access the information. This service may be offered for valuable consideration. All, or a part of collected location, control, and/or status information for one or more location and status monitoring devices may be made available, in various levels of specificity and/or aggregation for purchase by third parties. A software application executed by the controlling device may provide a user interface that can display information from or about location, control, and/or status monitoring device(s). The interface may further provide input portions that permit the user to enter information and/or commands Such a software application may be in the form of a "mobile app" for use on or execution by a mobile smartphone or dedicated device or processor thereof, or may be in the form of a software application for execution in a conventional personal computer (e.g., desktop or laptop or tablet) or enterprise computer system. In any case, the application's display features may include input mechanisms including mechanical or virtual: buttons, sliders, switches, text inputs, menu selections, and the like for entering data or changing settings. Accordingly, input mechanisms may include physical or virtual inputs such as keys, buttons, sliders, switches, etc. Moreover, the software application may utilize sensors provided in the controlling device itself and/or the monitoring and/or status device, including, but not limited to attitude, altitude, barometric and/or temperature sensors, accelerometers, gyroscopes, light sensors, user proximity sensors, microphones, speakers, etc. The display may present information textually and/or graphically. Graphics may include use of geographic maps, graphs, arrows, contour maps, level meters or charts, dials, gauges, and the like, or combinations thereof. Those having ordinary skill in the art will recognize a variety of approaches, not limited to the above-described, for presenting a user with a view of data and/or means to interact with the software application for control of a location, control, and status monitoring device or data associated therewith.

For example, an exemplary software application may present a user with a one or more menus or screens configured at least for permitting viewing and/or selection of user preferences or settings, for viewing data received from or related to one or more location and status monitoring devices, and for controlling functions and/or determining the status of the location, control, and/or status monitoring device(s). The application may include communication settings such as for pairing/bonding a location and status monitoring device with a relay and/or controlling device (e.g., the device executing the software application). In addition to such control and presentation of wireless (or wired) "handshaking", communication features may include transmission of commands and settings, receipt of sensor data or historical data, alarm/warning notifications (e.g., at loss or attainment of proximity), etc. In one example the communication features may permit a user to select among multiple available signals for use in calculating a location of a location and status monitoring device. Additionally, the user may be presented with a list of typical use scenarios that correspond to a particular set of available signals. For example, the user might select from among "air travel", "child tracker", and/or "proximity" settings, where an "air travel" setting selection may permit utilization of signals typical of an airport (e.g., various radar, cellular, and/or other signals). In contrast, selecting a "child tracker" setting may utilize GPS and/or cellular signals more typically available for outdoor use, while selecting a "proximity" setting may use only a device-specific type of communication (e.g., Bluetooth® Smart). Such communication modalities may also be useful in determining the status of or otherwise controlling the tracking, controlling, and/or status determining device.

For display settings a user may, in certain software application implementations, select from among color schemes, graph types, data types for display, analysis types for calculation and display, percentage vs. absolute amounts, etc. The software application may present options for whether, and in what way, to display certain information. For example, the settings may permit overlap of certain data (e.g., location and proximity) for presentation in a single screen, or may permit selection of the type and number of screens that a user may scroll through, each screen presenting different data, or a different view of data.

Moreover, the communication features of the software application may permit a user to interact with a third-party server or website in order to view sensor data, comparative data (e.g., with other users, similar items, similar locations or destinations, etc.). Communications with a third party may include a subscription component permitting the user of the software application to initiate and maintain a subscription to third party services. That is, a party other than the software application user may provide subscription services for which the user may enroll. The communication features of the software application may directly or indirectly provide the user with a way to securely transmit personal and/or financial information for such subscription.

The communication features of the software application may also permit a user to detect changes in the geolocation or status of a location and status device in tags, locks, or luggage in real-time. In some implementations, the software includes a feature that allows the user to select whether updates from a location and status device are transmitted in real-time or on a scheduled or random basis.

The software application may be used to manage features of a controlling device that utilizes a non-graphical information display, which may include various light emitting devices (e.g. LEDs), speakers, vibratory elements, and the like configured to provide appropriate information to a user. For example, the software application may control use of dedicated arrows or meter-bars to indicate direction and/or proximity of a location and status monitoring device. The software application may manage operation of an audio component for producing sound in response to particular events. As noted elsewhere in this disclosure, sounds and/or visual and/or vibratory notification signals may be generated and emitted from the controlling device and/or from a location and status monitoring device. The software application executed by the controlling device may cause the controlling device to emit sounds/visual/vibratory notifications, or may transmit a command or other notification-causing data to the location and status monitoring device for emission of such notifications by the location, control, and/or status monitoring device. That is, in some implementations the software application may cause transmission of a command to the location, control, and/or status monitoring device to emit a sound/visual/vibratory notification in which the sound/notification content is previously stored at the location and status monitoring device. On the other hand, the software application may cause the controlling device to transmit sound/notification content data to the location and status monitoring device such that the location and status monitoring device may emit the notification transmitted. In this way, the sound/visual/tactile notification for a particular location and status monitoring device may be customized according to user preference or circumstance.

In implementations in which the controlling device includes a graphical display, the display may be integrated with a touch screen or may be distinct from user input mechanisms. The graphical display may be controlled to present any combination of at least location, proximity/direction, status, maps, etc. Location may be presented at least as a description and/or as a map showing geographic location. The location may appear as a predetermined identifier on a map. For example, a graphical representation of the personal effect (e.g., tag, lock, luggage piece) may appear on a map to help distinguish and identify the personal effect for visual confirmation of location. When multiple personal effects are monitored, each personal effect may appear separately in the graphical representation.

Proximity/direction may be presented by showing both the user and the proximate device (e.g., location, control, and status monitoring device) on a map, by providing a textual description, and/or a graphic representation of distance. For example, the proximity may be presented as a distance (e.g., "20 ft"), as a level meter, and/or as a color-coded indicator (e.g., red=near, blue=distant). Direction may be indicated via a map, or by direction indicators (e.g., arrows) showing where the user may go to get closer to the location and status monitoring device(s). In implementations having multiple location and status monitoring devices the proximity and direction indicators may include identifiers for each location and status monitoring device. For example, an arrow tagged with a preset or user-selected identifier may point in the direction of a particular personal effect. The size, shape, and or color of the arrow may provide information regarding distance to the personal effect. Multiple personal effects (e.g., a plurality of luggage pieces) may have corresponding identifiers.

The software application may include a "library" of personal effects from which a user may select to monitor location and/or status. For example, a user may, according to circumstance, choose to monitor one or several luggage piece(s) being used for a particular trip. In another circumstance, the user may choose to monitor a location and status monitoring device associated with a different item, person, or pet. This permits the user to monitor the location and status of the personal effect, e.g., luggage, a pet, etc., having a location, control, and status monitoring device during one portion of a trip, and to monitor the location and status of a location and status monitoring device associated with another personal effect, e.g., a pet, during a different part of the trip. The user may further have the option of concurrently displaying information for all or a subset of monitored location and status monitoring devices. In yet other implementations, the user may be able to query a specified number of personal effects from the library and confirm that all selected personal effects are within a specified range of the controlling device or within a specified range of a geolocation and/or within a specified predetermined status, etc.

The software application may include a screen that presents location and/or status in a historical manner. For example, the application may cause display of past and present locations over time, thus providing a route of the monitored location and status monitoring device. Similarly, historical information may include status over time. For example, presenting the number of times that a lock associated with a location and status monitoring device has been opened may further present, for example, a list or map of locations and/or times at which the openings took place. In location and status monitoring device implementations having an associated image capture device, a list or map showing historic openings may selectably permit display of a photo or video captured during one or more of such openings. Moreover, historic data may include any combination of information collected over time. Thus, the historic data may include any combination of data collected over time, including at least location, proximity, altitude, pressure, battery level, etc. The historic data may be presented in any (or any combination) of graphs, charts, maps, color contours, lists, text descriptions, tactile presentations, vibrations, braille, audio descriptions or notifications, etc. Those having skill in the art will recognize that patterns and trends in data may be analyzed and presented for further consideration.

The software application may also include a feature that communicates with a processor of a location and status monitoring device to update software or firmware stored in the location, control, and status monitoring device. For example, the software application may update firmware periodically, or in response to a user command Firmware updating may include obtaining, e.g., by download, an updated firmware version, determining a software/firmware version currently in a location and status monitoring device, transmitting the update firmware if the firmware version is different from the obtained firmware version, and causing the location and status monitoring device to use the transmitted firmware version. The location and status monitoring device may be updated wirelessly or may in some implementations be configured for wired connection. Such wired connection may also be used for download of data to a computer and/or for charging a battery of the location and status monitoring device.

The software application may also be configured to monitor a software repository for an update version of the software application. Upon detecting an update version, the software application may prompt a user to update the software. Alternatively, the software application may be configured to receive a notification of update version, the notification being pushed from a software repository when an update version is available.

In some implementations, the predetermined threshold distance between the location, control, and status monitoring device and the control device may be about 3 meters or less, about 2 meters or less, or even about 1 meter or less, such as about 1 or 2 feet or less. In other implementations, the predetermined threshold distance can be about 10 meters or more or less. In still other implementations, the predetermined threshold distance can be about 50 or about 40 or about 30 or about 20 or about 15 meters or more or less. In some implementations, a user-configurable threshold distance can be set by the user through a user interface, or other input device, associated with, or otherwise in communication with, the controlling device. As an example, a controlling device can include one or more of software-based (e.g. a touch screen, a voice activated control, a keyboard, a trackball, a mouse, a stylus, or the like) and hardware based (e.g. physical buttons or switches, etc.) controls that can allow variation of the user-configurable threshold distance. Such controls can allow a user to configure the user-configurable threshold distance directly in terms of a distance or indirectly in terms of some other criteria (e.g. by providing choices based on factors that can include, but are not limited to, the importance of the personal effect, security of the area in which the personal effect is located, a desired level of caution, or the like), which correlate to an actual threshold distance. In some implementations, the threshold distance can be based upon the available communications technology (e.g., a functional range over which a reliable wireless communication link can be achieved between the controller and the personal effect), the importance of the personal effect to which the location and status monitoring device is attached, or the like.

In yet other implementations, the threshold distance can be based in part on the environment around the personal effect, for example, a location of the personal effect such as luggage within a baggage claim area of an airport or relative to a particular baggage claim carousel or conveyance machine. In some implementations, a triggering device at a particular location of a baggage claim carousel can trigger the tag on the luggage to cause transmission of a signal to notify a user of the luggage's present location and/or impending arrival. Circuitry such as an RFID or barcode scanner at a known location in the luggage's path (e.g., baggage handling pathway) may scan or detect the tag, causing a signal to be sent to its owner. Depending on implementation, the signal may be sent from the scanning device or from the tag directly to a user's controlling device or to an enrollee-accessible webpage, e.g., on an airline website, that is configured for such purpose.

In some examples, a user may wish to know a precise geolocation of a personal effect. Consistent with one or more implementations of the current subject matter, the controlling device may receive data from a corresponding location and status device indicating such location. In such cases, the location and status monitoring device may employ location sensors, receivers, or transceivers. Such location sensors can optionally include one or more technologies such as a Global Navigation Satellite System receiver (GNSS). Exemplary GNSS systems that enable accurate geolocation can include the Global Positioning System (GPS) in the United States, Globalnaya navigatsionnaya sputnikovaya sistema (GLONASS) in Russia, Galileo in the European Union, and BeiDou System (BDS) in China. Wireless signals from any signal emitter having a known location may be received and used for calculating location. Of particular use are signals that themselves include location information or a unique identifier that can be indexed to a known location. For example, alternatively or in addition to navigation satellite information, location sensors consistent with this disclosure can include radio frequency (RF) and/or microwave power sensors, such as heat-based (thermistor or thermocouple power sensors) or diode detector sensors. RF and microwave power sensors can allow radio frequency triangulation with respect to known-location transmitters such as cellular communication relay locations (e.g. cell towers), or other devices with known positions. Such signals, for non-limiting example, maybe based on the Institute of Electrical and Electronics Engineers' (IEEE) 802.11 standards (WiFi), IrDA (Infrared Data Association), ZigBee® (communications based upon IEEE 802 standard for personal area networks), Z-wave, wireless USB, or the like, and may include an identifier such as a Media Access Control (MAC) and/or Internet Protocol (IP) address of the transmitting device, or other typically unique identifier.

Other exemplary RF and microwave signal sources that may be used by a location/status monitoring device for determining location or proximity include those used for aviation, such as radar systems (e.g. high power radar or ground control radar for aviation), VHF omnidirectional radio range (VOR) stations, microwave landing systems (MLS), instrument landing systems (ILS), automatic dependent surveillance-broadcast (ADS-B), and ground control radios. RF signals from radio and television stations, as well as wireless utility meters for electricity, gas, and water can also be used. Depending on the type and strength of the RF or microwave signal that is detected, one or more antennas may be built into the luggage. In some implementations, the one or more antennas can be provided on the exterior of the luggage or just under the outer layer of the luggage; in certain implementations, the one or more antennas form a decorative design on the exterior of the luggage. For example, a location/status monitoring device may receive signals from two or more transmitting devices, where the signals include an identifier for the transmitter (e.g., Media Access Control (MAC) address), from which an absolute location of the transmitter can be determined by lookup. Analysis of the two or more signals can then be performed to calculate a location of the location/status monitoring device. In some such examples, a location and status monitoring device may include a processing unit that coordinates determination of the location of the device, such as using RF fingerprinting of one or more RF signal generators. The processing unit may also facilitate synchronization between a location and status monitoring device and a controlling device.

RF fingerprinting of radio frequency or microwave signals from an RF source can allow for more accurate triangulation by accurately identifying RF or microwave emitting sources having known locations by characteristics of those signals. In some implementations, multiple sensors for multiple types of RF or microwave signals can be used to identify and triangulate an accurate location. Geolocation can be correlated with an RF fingerprint of multiple RF or microwave sources, and known correlations of RF fingerprints and geolocations can be stored in a database. When RF or microwave signals from multiple sources are received by sensors on luggage, the RF fingerprint can be determined and compared with the database in order to determine the geolocation of the luggage.

RF signal analysis for proximity may include measurement of the received signal strength (or amplitude) of the radio signal. In some implementations, proximity of location and status monitoring device can be determined by reference to an object, such as another location and status monitoring device or a controlling device. For example, a Bluetooth® Smart signal from a location and status monitoring device may be analyzed to detect an approximate distance and direction from a controlling device. In another example, proximity may be obtained using Doppler principles. That is, a transceiver in the luggage may send a radio signal from the luggage to an object having a known location. The radio signal is then reflected from the object back to the transceiver. The returning RF waveforms are detected by matched-filtering, and delay in the return of the RF waveform is measured in order to determine distance from the object. In still another non-limiting implementation, a magnetic or electric field may be analyzed to detect disturbances in the field caused by movement of a relatively large dielectric object (such as a person or personal effect). Sensors can passively (and thus at low power) detect changes in spatial potential within the field and thus provide position, movement, and direction within the field.

Geolocation can also be determined by using inertial sensors (e.g. accelerometers and gyroscopes; see infra) either in addition to, or in place of GNSS, RF fingerprinting, or other location systems. If suitable RF or microwave signals are not available or have insufficient strength for detection, information from inertial sensors associated with the tag/lock/luggage disclosed herein can be used to calculate relative location using dead reckoning with respect to a previous location, or absolute location with respect to a last-known absolute location. As known by those of ordinary skill in the art, inertial sensor data on the current angular velocity and the current linear acceleration of a piece of luggage can be used to determine the angular velocity and inertial position of a device having such sensors. In some implementations, inertial sensors may be combined with a compass associated with the luggage to increase accuracy of direction calculations.

A user may wish to link or associate multiple location and status monitoring devices (e.g., multiple luggage pieces, pets, persons) to the same controlling and/or monitoring device. A user may additionally wish to link or associate multiple location and status monitoring devices to each other. In such scenarios, the user may designate one location and status monitoring device to be a dominant device that communicates to the controlling device, while the other location and status monitoring devices communicate to the dominant device. Such linkages may be unidirectional or bidirectional. An example of this would be the use of a location and status monitoring piece of luggage designated by a user to be the dominant device. The user could additionally have one or more tags and/or one or more locks on additional personal effects. The user may have synchronized the dominant device, e.g., the piece of luggage, with the controlling device. The tags and/or locks communicate their location and/or status information to the piece of luggage, which in turn communicates this information along with its own location and status to the controlling device. Such an approach can allow use of lower power communication devices (e.g. Bluetooth® Low Energy [BLE, a.k.a. Bluetooth® Smart], ANT+, RFID, IrDA, Zigbee®, etc.) on the location and status monitoring devices other than the dominant device, which can optionally include a higher power communication device such as a cellular transceiver or WiFi transceiver for communication over longer distances. In this manner, the dominant device can communicate with the controller device over longer distances and can communicate with the other location and status monitoring devices associated with other personal effects over shorter distances. In some implementations, a wireless mesh network may be used to allow the monitoring devices to route data and signals efficiently to and from the controlling or dominant device.

Synchronization or association of the controlling device with a location and status monitoring device or between two or more location and status monitoring devices may include an exchange of electronic data. The exchange of electronic data may notify an associated device (e.g., controlling device) of a unique identifier for each of the other devices, or may provide a code shared in common by all of the associated devices. A controlling device or primary location and status monitoring device may use unique identifiers to individually communicate with any or all of several associated location and status monitoring devices, and may obtain device-distinguishable data from each associated location and status monitoring device. On the other hand, when all devices share a common code for identification, the controlling device may treat a group of location and status monitoring devices as a single unit. In such implementations, a controlling device may learn of, e.g., proximity or location from any one of the associated location and status monitoring devices. This may be useful and efficient in instances where all of the associated location and status monitoring devices are typically considered together, such as a pallet or container of goods.

Implementations consistent with this disclosure may combine the use of unique identifiers and common codes in order to make use of the advantages of both schemes. A common code may alternatively be used to uniquely secure communications between the controlling device and location and status monitoring device(s). For example, the common code/password/key/token may be used as a part of an encryption scheme such as wireless access protocol (WAP), wired equivalent privacy (WEP), Wi-Fi Protected Access (WPA), variants thereof, or other standard or proprietary security protocols permitting secured communications. Such security protocols may implement cryptography algorithms such as advanced encryption standard (AES), data encryption standard (DES), RSA, and the like. In addition, communications may implement compression algorithms and/or hashing functions in order to reduce the amount of data transferred and to ensure data integrity. The encryption schemes may be implemented using dedicated circuitry and/or general purpose processors, and may further utilize processors, magnetic and/or solid state memory devices, electronic fobs, electronic dongles, SIM cards and the like, or any combination thereof.

Environmental Sensors used with Tags, Locks, and Luggage

In addition to geolocation of luggage and/or a personal effect using a location, control, and/or status monitoring device, a variety of other physical and environmental conditions may be detected using a location and status monitoring device in addition to, or instead of, the geolocation of luggage and/or an other personal effect associated with a location/status monitoring device. For example, environmental sensors such as thermometers, hygrometers, and barometers may be included with the monitoring device to measure changes in the temperature, humidity, or atmospheric pressure, respectively, of the local environment. The sensors may be integrated with or separate from the monitoring device but in data communication with the location, control, and/or status monitoring device. For instance, the sensors may be located internal to the location, control, and/or status monitoring device, e.g., tag, lock, or luggage or otherwise associated with a personal effect being monitored, to detect changes inside or around the tag, lock, or luggage or other personal effect.

Consistent with this disclosure, the location/control/status monitoring device may detect changes in the composition of the air or atmosphere surrounding or inside of the luggage or other personal effect associated with the location/control/status monitoring device. For example, the levels of oxygen, carbon monoxide, carbon dioxide, nitrogen, methane, hydrogen sulfide, and other gases may be detected using one or more chemical, electrochemical, catalytic, or infrared sensors, which amounts may be communicated to a suitably coupled control device. In addition, microfluidic and/or micro-electro-mechanical (MEMS) devices can be used to detect the presence of biological organisms or by-products in the air, such as bacteria, viruses, fungi, or other organisms, as well as pollen or aerosolized protein for communication with said linked control device. In certain implementations such sensors may detect the presence of medicinal or recreational pharmaceuticals in or near the location/control/status monitoring device. A magnetometer can be used to sense increases or decreases in magnetic field and thus the magnetometer's proximity to a magnetic substance. In some implementations, radiation sensor and dosimeters may also be used to detect changes in x-rays, alpha particles, beta particles, and gamma particles.

Movement of luggage or other personal effects can also be detected with a location and status monitoring device by integrating or linking a variety of different inertial sensors. A gyroscope and/or accelerometer may be used to detect changes in the orientation and rate of movement in a given direction of luggage and/or other personal effects associated with the location, control, and/or status monitoring device. Such sensors can be used to estimate approximate location from a known or estimated geolocation, or can be used to determine relative proximity to other location and status monitoring devices. In some implementations, movement input data from gyroscopes and/or accelerometers can be analyzed to determine the number of steps that a person carrying the luggage or other personal effect has taken over time, acting as a pedometer. Luggage or other such conveyance implementations having wheels that allow for rolling conveyance of the personal effect, e.g., luggage can have mechanical or digital odometers that measure the rotation of the wheels, allowing calculation of the distance that the wheels have been used to convey the luggage.

Pressure sensors and/or strain gauges linked to the location, control, and status monitoring device can be included in luggage and/or personal effects to detect pressure and/or deformity of luggage. Luggage or other containment vessels with a location, control, and/or status monitoring device may further be able to assess the weight of the personal effects, or items, within the luggage. This can be accomplished using pressure plates or other sensors in the base of the luggage, using strain gauges on the handles or walls of the luggage, or the like. For example, if an item is removed from the luggage and thus reduces pressure on the pressure sensor, the pressure sensor can detect the change and report the change to the status monitoring device using a wired or wireless data connection, as described herein above. In another example, one or more pressure sensors in the bottom of luggage can detect whether the luggage has been picked up or set down and/or dropped. In addition, or alternatively, a pressure sensor in the handle(s) of the luggage can detect whether a person has touched the handle and for how long. The luggage may also have fullness sensors to indicate the degree to which the volume of the luggage is occupied.

Fullness sensors may be pressure based, deformation based, motion based, sonic frequency based (e.g. device that sends and receives ultrasonic signals to determine distance), or optically based sensors (e.g. three-dimensional scanners). Deformity or crushing of luggage may also be detected by pressure sensors and/or strain gauges included in the surfaces of luggage; such sensors and strain gauges may be used to determine if a personal effect, such as luggage, has been dropped and/or the magnitude of the impact from the drop.

In some implementations, one or more sensors are disposed on at least one handle on the luggage or personal effect. When a person touches the handle of the luggage, health and physiologic data of the person may be measured, analyzed, and recorded. Exemplary sensors may include an optical pulse oximeter (to non-invasively measure oxygenation of the user's blood, as well as heart rate and/or blood pressure), or an electrical heart rate monitor that measures changes in electrical signals (such as an R-wave, related to heart rate) from the skin of the hand.

In some implementations, an electrochemical sensor is integrated with at least one handle of the luggage or personal effect, or to a portion of the luggage or personal effect, such as a lid. The electrochemical sensor may take in body fluids (e.g. blood, saliva, perspiration, or tears) from a person handling the luggage via capillary action into a microfluidic device, and electrochemically detect one or more components of the secretion. Alternatively, the electrochemical sensor may be integrated with a woven or nonwoven material (e.g. textile or felt) or wearable polymer (e.g. Gore-Tex® or neoprene). An electrochemical sensor may detect the presence, absence, or amounts of biomarkers such as cells, lipids, carbohydrates, mineral salts, trace metals, amino acids, proteins, nucleic acids, dissolved gases, drugs or drug metabolites, or other chemical compounds in the body fluids of the person. The sensor may utilize polymerase chain reaction to amplify nucleic acid components of the secretion. The sensor may include nucleic acids (e.g. single stranded nucleic acids or aptamers), proteins, or other compounds to detect specific analytes in the secretions.

A microphone, speaker, and/or a camera can be integrated with or linked to the location, control, and status monitoring device to monitor sound and images inside the luggage, as well as outside the luggage. The camera, speaker, and microphone can be integrated into a lock or tag that is attached to the luggage or can be integrated into the luggage itself. The microphone can detect sounds in response to a change in the location or status of the luggage, and either record the sounds for later retrieval or transmit a data representation of the sounds to a controlling device. Similarly, a camera on a lock or a camera integrated with luggage can take still or moving images of the interior, exterior, or immediate vicinity of the luggage in response to a change in location or status, and either record the images for later retrieval or transmit the images to a controlling device. A photodetector can also be used in conjunction with a status monitoring device to detect changes in light levels either inside the luggage, or outside the luggage. In one example, the microphone and/or photodetector positioned inside the luggage may be used to detect when luggage has been opened by noting a change in loudness or clarity of sounds, or by detecting a change in available light. Suitable photodetectors include complementary metal-oxide-semiconductor (CMOS) active pixel sensors, charge-coupled devices (CCD), chemical photo plates, photodiodes (such as reverse-biased light emitting diodes), photoresistors, photovoltaic cells, and the like.

A biometric scanner or sensor can also be integrated with luggage or personal effect of the present technology, and linked and/or integrated with the status monitoring device. A biometric scanner, such as a fingerprint scanner, may be implemented to capture biometric data using a variety of implementations, including optical detection (using visible light or infrared light), capacitance, or ultrasonic detection. Biometric features detected by a scanner may include fingerprints, handprints, iris, retina, blood vessel, or a face. Optical detection methods use a form of light to illuminate a body part, and the light reflected from the body part is detected and analyzed to image the body part. For example, visible light can be projected onto a fingertip, and light reflected back from the fingertip can be detected using a charge-coupled device to image the fingerprint associated with that finger. Alternatively, a finger, hand, or retina can be illuminated with infrared light (700 nm to 1000 nm wavelength) in order to detect blood vessels in the tissue, which are unique to a given individual. Similarly, the iris of the eye can be imaged using infrared light, visible light, or a combination of visible and near infrared light. Ultrasonic imaging of fingerprints can be done with piezoelectric transducers that produce high frequency sound waves to penetrate the epidermis and are reflected by the dermis. Piezoelectric transducers then detect the reflected sound waves and the data are interpreted to image the fingerprint. Fingerprint images can also be obtained using either passive or active capacitance techniques. In passive capacitance, the dermis of a finger acts as a capacitor plate, the epidermis is a dielectric, and the sensor is a second capacitor plate (e.g. a silicon chip with an array of capacitors). Differences in capacitance between the valleys and ridges of a fingerprint allow imaging of the fingerprint. In active capacitance, the sensor/capacitor plate is charged, creating an electromagnetic field. The skin of the finger interferes with the electromagnetic field to change the effective capacitance, which is sensed and imaged.

In some implementations, a biometric sensor acts to analyze the voice of a person (a speaker) and includes a microphone that senses one or more voices. The biometric sensor may further include circuitry to process data representing the one or more voices in order to identify the person(s) speaking. Alternatively, the microphone may relay the voice data to the status monitoring device. The status monitoring device, or a computing device linked to the monitoring device, can analyze a detected voice or voices for unique features and compare those features or qualities to those of one or more enrolled voices to determine if they match. In some implementations, more than one biometric sensor is used with the luggage, such as a speaker recognition system and a fingerprint scanning system, to allow for multi-factor authentication of an authorized user.

In some implementations of the present technology, the luggage or personal effect includes an optical scanner that detects data contained in one-dimensional data block (e.g. bar codes) or two-dimensional data block, such as QR codes or periodic self-clocking glyph shape codes (e.g. DataGlyphs® or Microglyphs®). In some implementations, the luggage or personal effects have a unique tag identifier that is encoded in a one-, two-, or three-dimensional data block. For example, one-dimensional data blocks, two-dimensional data blocks, or three-dimensional data blocks may be included with the luggage or tag to allow identification of the tag using an optical scanner configured to detect the code.

Actuators & Outputs

In some instances, it is desirable for tags, locks, and luggage of the present disclosure to have signal outputs that allow a user to determine whether any environmental or interior changes with the luggage have occurred. Signal outputs may include lights, sounds, tactile, haptic signals, electrical discharge, visual displays, scent emitters, or mechanical actuators.

For example, tags, locks, and luggage contemplated herein, and/or the controlling device can include one or more lights (e.g. light emitting diodes) that are activated in response to certain threshold level of input data or to changes in relative levels of input data. For example, one or more lights on the interior or exterior of the tag, lock, or luggage may be activated if the personal effect or luggage has come within or been moved away from a specified distance, such as a specified distance in relation to the controlling device. Multiple lights may be used that flash in a specified or random sequence, e.g., sequence of colors or flashing sequence, or the lights may modulate their intensity depending on the proximity and/or environmental change sensed by the personal effect, e.g., luggage. In some implementations, a bright light may be activated to illuminate the interior or exterior of the luggage in response to a specified input. Lights used with the luggage may emit colored light (red, orange, yellow, green, blue, indigo, violet, etc.), white light, ultraviolet light, or infrared light. In some implementations, the personal effect, e.g., luggage, can be configured to turn on a sterilizing ultraviolet light on the interior of the luggage (or proximate the exterior of a luggage handle) in response to exposure to hazardous organisms, such as bacteria.

Audible sound, ultrasonic, and subsonic frequency signals can also be emitted from the tag, lock, or luggage, and/or controlling device in response to a certain threshold level of input data or to changes in relative levels of input data. For example, one or more audible sounds, near ultrasonic frequencies, ultrasonic frequencies, or subsonic frequencies may be emitted. The one or more sound frequencies may vary in amplitude and duration. Ultrasonic (higher than 20,000 Hz) or subsonic (lower than 20 Hz) frequencies can, at sufficient amplitudes, be used to transmit information inaudibly. In some implementations, the sound frequencies emitted constitute an audible siren. In some implementations, the sound frequency signal is near ultrasonic and is emitted at an amplitude that causes discomfort to people in close proximity. In some implementations, the sonic frequencies emitted may be a representation or recording of a human voice, an animal sound, such as a dog bark, or some other recorded sound. Subsonic frequencies also can, at sufficient amplitude, be used to cause discomfort in people in close proximity.

Tactile or haptic signals are another type of signal output that can be created by the tag, lock, or luggage and/or controlling devices of the instant technology in response to a predetermined movement or change in the environment. The amplitude, timing, and duration of the haptic signal can be varied to indicate to a user the nature of the changed input. For example, a controlling device can vibrate in response to a data signal from a monitoring device when luggage or personal items associated with the monitoring device is within a certain range of the controlling device. Similarly, the luggage can be configured to send vibrations to the handle or other specific portion of the luggage to alert a person carrying the luggage that the controlling device is inside or outside a predetermined area. The haptic signals can include vibrations as well as direct electric discharge. Direct electric discharge can be a low current discharge that is detected on the skin, or a higher discharge that causes physical discomfort. Haptic actuators can include, but are not limited to, vibrating motors, electrically conductive surfaces coupled with a charge creator, subsonic sound waves, electroactive polymers, piezoelectric actuators, electrovibration actuators (e.g. indirect charge actuators such as TeslaTouch™) and the like.

Tags, locks, and luggage and/or controlling devices of the present technology can also have a display to communicate to a user that the luggage has experienced one or more environmental or internal changes. Suitable displays include electronic paper (e-paper), passive-matrix or active-matrix organic LED displays, thin film polymer LED displays (e.g. poly(p-phenylene vinylene)), quantum dot displays, standard or cholesteric LCD displays, interferometric modulator displays, electroluminescent displays, fluorescent displays, and the like.

Mechanical actuators can also be integrated with the personal effect, e.g., luggage, and respond to signals generated by sensors in the personal effect, e.g., luggage. For example, a motor can move wheels of luggage or other conveyable personal effect having wheels and enhance or impede movement of the wheels in response to sensing movement of the personal effect. Alternatively, a wheel motor can manage movement of the luggage in response to the luggage being moved outside of a given radius, e.g., in order to steer the luggage back within the desired radius, or even to a specific location. A mechanical actuator can extend or retract one or more handles in the luggage in response to a signal from one or more sensors. For example, if a monitoring and/or controlling device is detected within a given radius of the luggage, a handle can extend from the luggage automatically, allowing a user to grasp the handle. Similarly, the handle actuator can retract the handle(s) of the luggage and prevent extension of the handle if a controlling device is not detected within a certain radius. A lock actuator can also be integrated with a personal effect, e.g., luggage, such that the lock engages (locks) when a controlling device is not detected by the luggage within a certain radius, and disengages (unlocks) only if a signal from a controlling device is detected by the luggage. In some implementations, the lock is integrated with the luggage and lock actuator, in other instances it is not. In some implementations, the lock actuator is capable of locking a purely mechanical lock (such as a padlock) that is not specifically configured for use with the lock actuator.

Another example of a mechanical actuator is a vacuum pump in the luggage that can create a vacuum in the luggage, making it difficult to open the luggage. Alternatively, an air pump actuator included with the luggage can fill a bladder that facilitates closing and/or locking of the luggage. In some implementations, the luggage includes a marking actuator that releases a marking dye or ink after sensing the opening of the door of the luggage or disabling/breaking the lock.

Securing Features

A user may wish to have additional information regarding his or her personal effect, such as whether or not the personal effect was tampered with while out of his or her sight or otherwise not in his or her possession or control. In such instances, the user may employ a location, control, and/or status monitoring device that includes a securing and/or locking mechanism. The locking mechanism may have one or more functions in addition to those discussed above for the tag 105 in FIG. 1, which can include but are not limited to preventing unauthorized removal of the device from the personal effect; maintaining the personal effect in a closed or locked state; and both locking and unlocking, or the like, in response to communication from a controlling device. Additionally, the locking mechanism may include an attachment component 110 (see FIG. 1), which may optionally include one or more of a ring, a strap, a belt, a loop, a band, a cable, an adhesive, or the like, or any combination thereof. The locking mechanism may include a memory in which to record the number of times the locking mechanism is changed from the locked state to the unlocked state. The memory of the locking mechanism may record the date and time the locking mechanism is changed from a locked state to an unlocked state. Alternatively or additionally, the memory of the locking mechanism may record the location each time it is changed from the locked state to the unlocked state. In some instances, the locking mechanism may be a lock that attaches to a personal effect, such as a lock on a bag or trunk. The lock may have a variety of configurations. In some implementations, the lock may be a padlock that utilizes a combination of symbols entered in a specific order in order to disengage the locking mechanism. In some implementations, the padlock includes a key and tumbler system, in which a key moves pin, wafer, disk or other type of tumblers to disengage the lock. In some implementations, the tumblers may include embedded magnetic tumblers that move in response to a magnetic force provided by the key. In some implementations, the lock may be disengaged in response to a signal from a biometric sensor (e.g. a fingerprint or iris scanner) that matches biometric input to stored biometric data. In some implementations, the padlock includes a solenoid actuator, a motorized actuator, or an electroactive polymer that moves in response to an applied voltage, that can electrically engage and disengage one or more pins, shackles, screws, or cams that can keep a lid or opening closed.

As noted above, a locking mechanism may be attached to at least one strap, belt, loop, band, cable or the like, for convenience referred to in this paragraph as "strap". In such implementations, the locking mechanism has a lock body attached to a first end of the strap and, in some implementations, a latch plate attached to the second end of the strap. The lock body includes an opening configured to accept the second end of the strap, or the latch plate. A sequence of holes in the strap may permit variation of the latched perimeter length of the strap when the strap is latched, where the second end of the strap may pass through the lock body. A user may cinch the strap to a desired length and engage one or more of the holes at the desired position with one or more pins or latches inside the lock body. In certain implementations, the latch plate itself has one or more holes in the latch plate configured to align with one or more pins or latches inside the lock body. In some implementations, the latch plate may include a first clasp mechanism configured to interact with a second clasp mechanism inside the lock body. In some implementations, when the lock is disengaged (unlocked), the latch plate remains secured in the lock body, and a button or lever can be depressed to release the latch plate from the lock body.

In certain implementations of the locking mechanism, the lock can be disengaged using two or more electronic and/or physical keys. Alternatively, the strap may accommodate use of a secondary locking mechanism, e.g., provided by a third party. Both alternatives can allow for a "master" key or code provided to travel security agencies, such as the Travel Security Administration (TSA) in the United States, allowing them to unlock, open, inspect, and relock the luggage while limiting access to others. For example, the locking mechanism can be opened by inputting a symbolic sequence that can be set by the user of the locking mechanism, as well as by using a physical key that is held only by members of a travel security agency. In another example, the locking mechanism can be unlocked by inputting a specific alphanumeric or symbolic sequence that can be set by the user of the locking mechanism, as well as by inputting a second electronic key of at least two other alphanumeric or symbolic sequences that are rotated on a non-regular periodic basis.

In another implementation, the user can instruct the locking mechanism to produce a one-time-use symbolic sequence that can only unlock the locking mechanism once (or some limited number of times). This one time use symbolic code can then be supplied on a display device or a disposable paper/plastic tag attached to the luggage. The symbolic code can be encoded using a datablock (e.g. a QR code or Dataglyph®) that can be read and interpreted by an optical reader used by the security personnel. In implementations in which the one-time code is shown on a display of the locking mechanism, the one-time code can be automatically removed from the display and/or removed from the memory of the locking mechanism after a predetermined amount of time. This can prevent misuse by non-authorized persons who may try to read the one-time code after the luggage has already been examined. In some implementations, the one-time-use code can be supplied an external controlling device that communicates the code to locking mechanism. For example, if the external controlling device includes a biometric scanning feature, entry of the locking code as well as the proper biometric feature in the scanner provides sufficient authentication to issue a temporary, one-time-use symbolic code to the locking mechanism. In some implementations, during ticket issuance, a temporary one-time-use code is produced by the issuing travel entity (e.g. airline or train line), and is entered by the user of the luggage using either an input device on the locking mechanism itself or a controlling device. In such an example, the code issued on the ticket is not stored by the airline and is only printed on the ticket.

In yet another implementation, the locking mechanism may incorporate communication circuitry for communicating with a device held by the travel security agency. The communication circuitry may implement an authentication protocol to ensure the identity of the person or device with which the locking mechanism communicates. Authentication may be responsive to a physical or electronic unlock request or may be performed automatically when a signal from the device held by the travel security agency is detected. Once authenticated, the locking mechanism becomes unlocked.

A location, control, and/or status monitoring device that is a suitcase, a piece of luggage, or the like may have additional features that further protect the personal effect within the device or that facilitate the user's utilization of the device. Such additional features include a sealing closure to prevent moisture or other unwanted substances from entering the device (i.e. suitcase or piece of luggage). The sealing closure may include an inflating component that inflates upon locking the suitcase or piece of luggage via a cartridge of compressed gas, a pump, or the like. The sealing closure may also serve the additional purpose of making the suitcase or piece of luggage buoyant in water and similar liquids. Other additional features can include, but are not limited to, wheels that lock, wheels that are powered for easy conveyance of the suitcase or piece of luggage, a light source in a handle of the suitcase or piece of luggage, a light source within the suitcase or piece of luggage, a light source along the bottom of suitcase or piece of luggage, a biometric security feature, a physical key, or code that may be manually entered for use by travel security agencies or in the event the device cannot be opened by the controlling device, the ability to send a still or moving image from the monitoring device to the controlling device, an electric/chemical shocking mechanism for deterring unauthorized access or contact with the suitcase or piece of luggage.

In some implementations, the lock or securing mechanism is integrated with the suitcase or luggage. The securing mechanism may prevent the lid or opening of the luggage from being accessed, or may prevent wheels of the luggage from turning, or prevent one or more handles of the luggage from being released or accessible. The lock mechanism that keeps the lid or opening of the luggage closed may have several configurations. For example, the lock mechanism may include a solenoid or motorized actuator that moves a pin, a cam, a shackle, or a screw to lock or unlock the door, wheel, or handle of the luggage. In some implementations, the opening of the luggage is held closed using an expandable bladder, the expansion and contraction of which can engage or disengage the locking mechanism. The bladder may be expanded or contracted using a fluid, such as a gas or liquid, that is pumped in and out of the bladder. The bladder is associated with one or more latch mechanisms that move in response to changes in bladder volume. In one implementation, the locking mechanism may be reciprocal clasps on either side of the opening of the luggage that can keep the lid or opening of the luggage or personal effect closed, but can be opened by a person using their hands. When the luggage is locked, a bladder proximate the interacting reciprocal clasps is expanded with liquid or gas, and exerts sufficient force lateral to prevent the reciprocal clasps from being separated in a vertical direction.

The luggage or other personal effect may include an engagement mechanism. The engagement mechanism can include one or more engagement members, interlocking members, attachment members, closing members, coupling members or the like. The engagement mechanism can include, without limitation, a zipper or set of zippers, one or more latches, a channel and corresponding protrusion to engage with the channel, and one or more bolts, screws, pins, hook and loop connectors, or the like. The engagement mechanism can also include one or more electro-magnetic engagement member, employing one or more magnets that may or may not be electrically controlled. In some implementations, the engagement mechanism can include a coupling member such as an adhesive, glue, tape, or the like.

The luggage may include mechanisms for closing the lid or opening of the luggage automatically. In some implementations, the lid or opening is lined with a toothed zipper having a motorized slider that is internal to the luggage and cannot be actuated manually from the outside of the luggage. The motorized zipper slider can open or close the two sides of teeth. Upon receiving a signal to open from a controlling device, the motorized zipper slider slides along the zipper and locks or unlocks the teeth. In some implementations, the engagement mechanism includes a single flexible and continuous hook on either side of the opening, to provide a waterproof seal. A motorized slider internal to the luggage can engage or disengage the flexible continuous hooks to seal or unseal the opening of the luggage. The luggage may also be opened and closed using a motorized rack and pinion system in which a motor turns a pinion gear with teeth that interact with a rack having teeth or cross pieces separated by holes in the rack (similar to ladder rungs). The rack is attached with one sides of an opening or lid and interacts with the pinion on the other side of the lid, allowing the lid to be opened or closed upon actuating the mechanism.

In some implementations, the lid or opening of the luggage can be held closed by creating a partial vacuum within the luggage and maintaining a seal at the opening of the luggage. In certain implementations, the locking mechanism may utilize a pressure differential between the atmospheric pressure on the ground and the reduced atmospheric pressure in an unpressurized cargo hold of an aircraft in flight. In such implementations, the luggage may have an airtight seal when closed, and a one-way valve that allows air inside the sealed luggage to escape but not re-enter. As the atmospheric pressure in the cargo hold drops, air escapes from the one-way valve to equalize the atmospheric pressure inside and outside the luggage. As the aircraft descends for landing, and exterior pressure increases, the pressure difference between the interior and exterior is maintained as air is unable to re-enter the one-way valve. This pressure differential, with a relative vacuum in the luggage interior, makes the luggage extremely difficult to open. When the luggage user wants to open the luggage, an RF signal may sent from a controlling device, such as a mobile phone, to a receiver inside the luggage that opens the one-way valve, or opens a separate small aperture or hole in the luggage (e.g. a release valve), to allow the pressure to equalize. In some implementations, a pressure differential may be applied to the luggage through the one-way valve before the luggage is loaded into the aircraft, for example by employing a pump (such as a hand pump, bicycle pump, or gas or electric air pump). The one-way valve, or release valve if used, may be a solenoid valve, or use a controllably deformable material such as an electroactive polymer to open and close the valve (see infra for description of electroactive polymers).

In some implementations, the locking mechanism may include use of electroactive polymers or electroactive polymer/ceramic hybrids that bend in response to an applied voltage. In some implementations, the electroactive polymer may bend in response to an applied voltage and allow the clasp to disengage. Thus, a continuous voltage does not need to be applied to keep the luggage in a locked configuration. Exemplary configurations of locking mechanisms are described in U.S. Pat. No. 7,299,630 and U.S. Patent Application No. 2010/0126240, each of which is incorporated by reference herein.

In some implementations, a securing mechanism for the wheels may prevent them from turning. For example, the inner face of the wheel (facing towards the centerline of the axle), may have one or more indents configure to fit a pin. When the securing mechanism is engaged, a pin is pushed out of a wheel well of the luggage and into the one or more indents in the wheel to prevent the wheel from rotating. In some implementations, the indents on the inner faces of the wheels are brought into contact with one or more pins in the wheel well by shortening the axle and retracting the wheels towards the centerline of the luggage. One having skill in the art would understand that in certain implementations, the pins may reside on the wheels and the indents may be located in the wheel wells.

Also consistent with this disclosure, the location, control and/or status monitoring device in luggage may include control for one or more assistive features that can aid a user in lifting the luggage, e.g., into the user's vehicle. For example, the location and status monitoring device may transmit, by wire or wirelessly, a signal to control a lift-actuator, lift-pump, lift-motor, etc. of a lifting mechanism. The lift-actuator may include any one or a combination of electric motor, hydraulic or pneumatic pump, piezoelectric motor, or other means for converting energy into motion. For example an electric motor fixed to the luggage body may convert energy from a battery or other electrical-energy storage into a rotational movement of a shaft, thus rotating a gear or wheel (pinion) attached to the shaft. The gear may be positioned to engage with a vertically-positioned linear gear bar (rack) attached to a moveable portion within the luggage. The rotation of the gear/wheel thus causes the pinion, along with the attached moveable portion, to travel up or down with respect to the luggage. In one implementation, the moveable portion may extend beneath the luggage to a base or "foot" portion capable of supporting the luggage when the luggage is elevated on the moveable portion. The moveable portion may be implemented as a variation of an extendable handle, such that for lifting purposes the handle extends downward instead of the usual upward extension in which the user may pull the luggage.

In another implementation, the moveable portion may include a scissor lift mechanism at a bottom portion of the luggage. The scissor lift includes scissor legs attached to each other via a pivot at a central portion of the legs. In this case the actuator may drive extension and retraction of the scissor legs by directing generally-vertical force to the hinge connecting the scissor legs or between the bottom end of a leg and the top end of another leg. Such force may be applied directly or indirectly by a rack and pinion, hydraulic or pneumatic ram, screw, or the like. It should be noted that the scissor lift mechanism may be also be used as a support or stand for the luggage or other item to which it is attached, e.g., for convenient access in a hotel room.

A hydraulic or pneumatic ram may be employed as a lift mechanism or as part of a lift mechanism. In this case, hydraulic fluid may be used in conjunction with a master-slave cylinder system to multiply force or distance in the hydraulic ram. In the case of a pneumatic system a gas is compressed using a pump for use in moving the pneumatic ram. Pre-compressed gas may alternatively be used for moving a pneumatic ram. Luggage having a hydraulic or pneumatic lift mechanism thus includes the ram and fluid systems for moving the ram. Each of these systems may be electrically controlled.

In still another implementation, the actuator may be a pneumatic pump controlled to inflate or deflate a bladder affixed to the bottom of the luggage in order to lift or lower the luggage. The bladder may be formed of a robust material that has no, or very low, air permeability. The bladder may be enclosed in a bottom compartment of the luggage between uses.

In yet another implementation, the actuator may include a motorized spindle or drum which retractably holds a strap, cord, belt, or chain. The strap/cord/belt/chain may include an attachment hook or the like that can attach to a vehicle feature. Once securely fastened (e.g., hooked) to the vehicle feature, the actuator may be engaged to retract the strap/cord/belt/chain, thus lifting the luggage. For example, the strap/cord/belt/chain may be extended from a holder in or on the luggage (e.g. near the bottom of the luggage) and an attachment hook affixed to the extended end of the strap/cord/chain may be hooked over a bottom lip of a vehicle trunk. When the actuator is engaged, the luggage is lifted up to the trunk level as on a conveyor. In addition to being motor driven, the spindle may be pre-tensioned, e.g. using springs, into a retracted position. A sufficiently pre-tensioned spindle may reduce the amount of motor energy necessary to lift the luggage.

In still another implementation, motorized wheels of the luggage (discussed elsewhere in this disclosure) may aid climbing a ramp into a vehicle compartment. The motorized wheels can in some implementations be used to drive a conveyor, roller(s), or belt(s) on a side of the luggage. The conveyor, etc. may, with sufficient leverage provided by angle of the luggage, "climb", e.g., an ingress portion of the user's vehicle. It will be recognized that the conveyer/rollers/belts may have a driving mechanism separate from the luggage's wheels.

In some of the above-described luggage lifting implementations, the lifting mechanism may alternatively be configured for manual operation. For example, the strap/cord/belt/chain implementation may include a winch handle for attachment to the spindle or drum to permit manual retraction by turning the spindle/drum via the winch handle. In another implementation a strap/cord/belt/chain may include a manual winch. Manual and powered lifting means may be combined for a "power assisted" lift. This may extend the life of a battery, or permit use of a smaller, lighter-weight battery. Additionally, a series of pulleys or gears may be implemented to reduce the power necessary to lift the luggage.

Battery and Power Components

To power the acquisition and transmittal of location and status information, a location, control, and status device may include a battery. The battery may be rechargeable. The location and status device may include a kinetic-to-electric energy conversion element, a component for connecting electronically to another power source, or both a kinetic-to-electric energy conversion element and a component for connecting electronically to a separate power source. Examples of kinetic-to-electric energy conversion elements include fly wheels attached to the wheels or a pulley, dynamos, and the like. Photovoltaic or other solar power technology may be used to recharge a rechargeable battery in a location and status monitoring device. The location and status monitoring device may include a component for connecting electronically to another power source such as a USB power interface, a power interface that is compatible with standard household current and receptacles, a power interface that is compatible with a car cigarette lighter, and the like. In some implementations, a wireless charging interface may be provided, such as an inductive charger (e.g., Qi, PMA), microwave power transfer, and the like. Such power interface options may be used to charge a rechargeable battery within the location and status monitoring device, used to charge an external device which can connect to the location and status monitoring device via a USB or other interface, or to both recharge a batter and charge an external device.

Power conservation schemes can be utilized to minimize excessive battery drain and channel power to appropriate actuators and sensors at appropriate times. Power conservation algorithms stored in a microcontroller integrated with the luggage can determine when power is used to facilitate communication between sensors and actuators in the luggage, as well as communication with a controlling device that is separate from the luggage. During periods of storage of the luggage described herein, power may be withheld from displays (e.g. LED displays), lights, loudspeakers (to generate sound), or the actuators. The power conservation scheme can also manage one or more predetermined time periods in which power is supplied to sensors, wireless communication devices, or actuators, and then removed.

Uses of Location and Status Monitoring Devices

Figure 4:
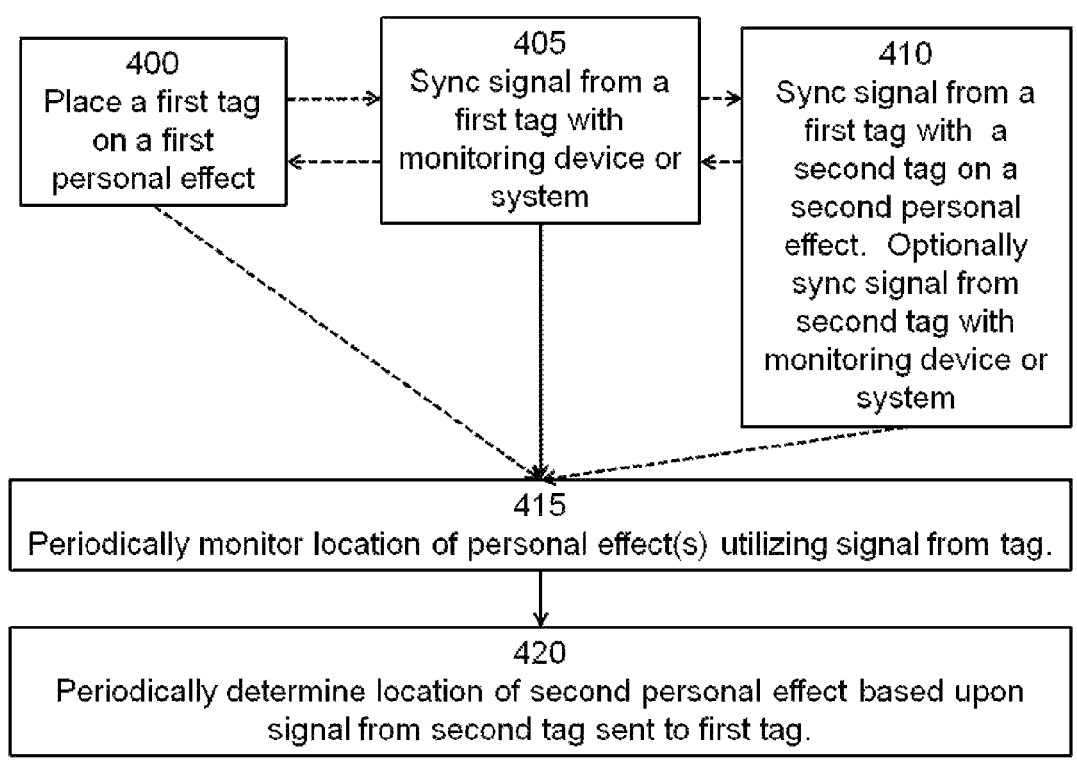
FIG. 4 shows an exemplary diagram of implementation of one or more location and status monitoring tags.
Figure 5:
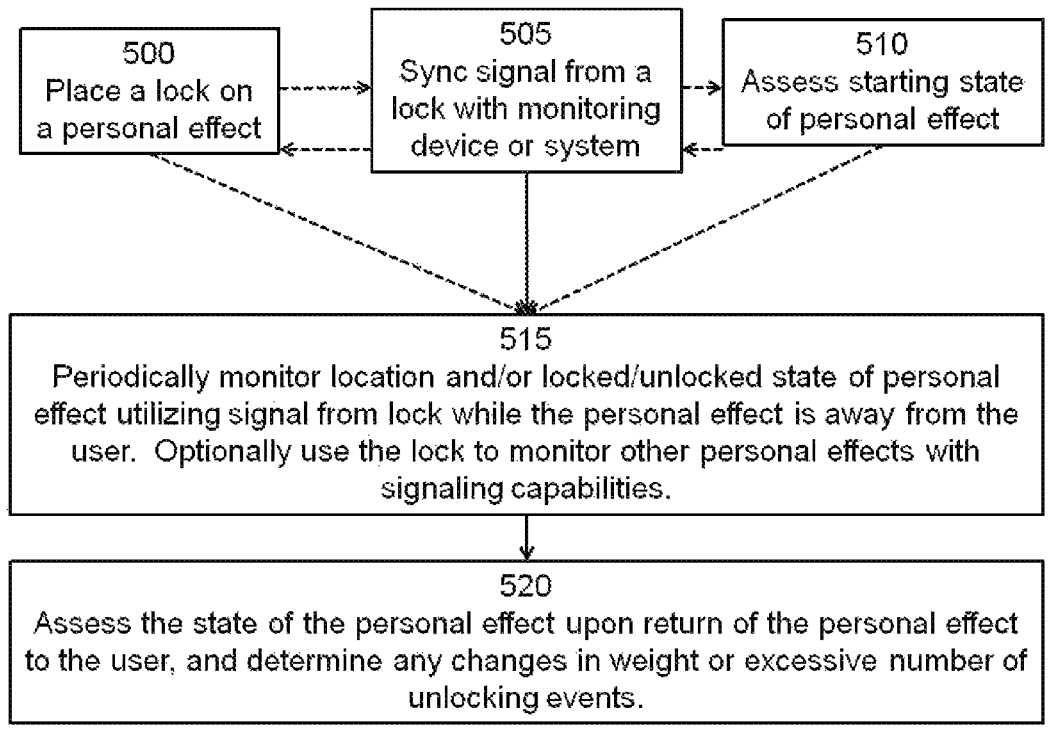
FIG. 5 shows an exemplary diagram of implementation of one or more location and status monitoring locks.
Figure 6:
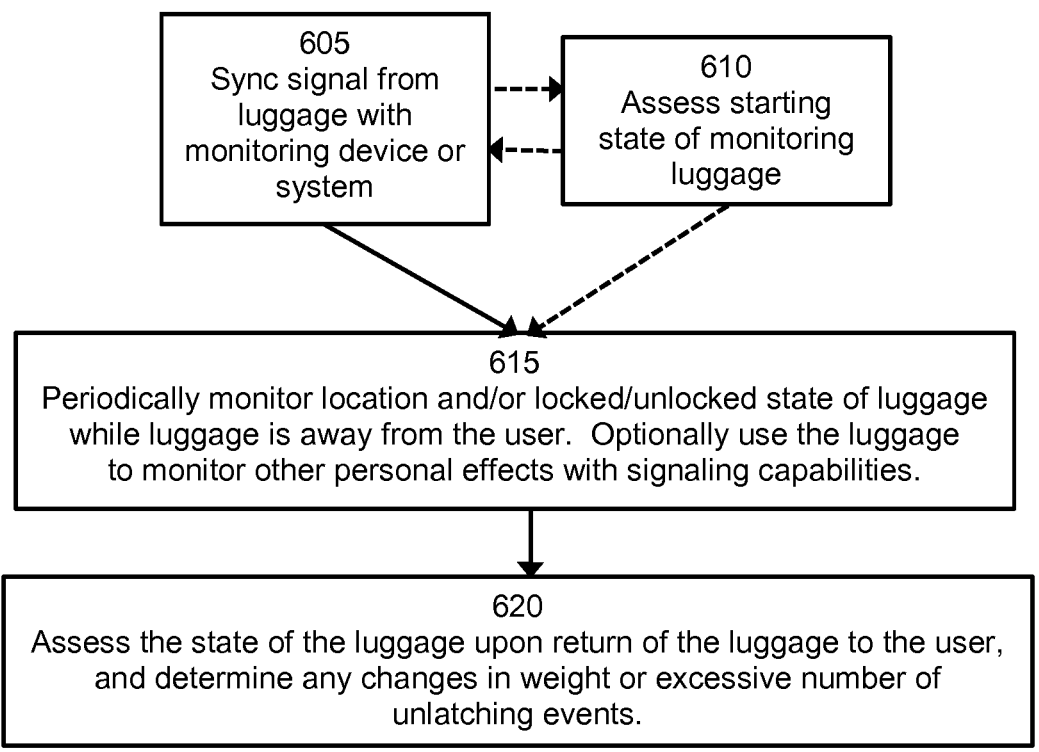
FIG. 6 shows an exemplary diagram of implementation of a location and status monitoring luggage.

Use of the various types of location and status monitoring devices is outlined in FIGS. 4-6. FIG. 4 shows an implementation of a method of monitoring the location and status of a personal effect with a tag. The following can take place in any suitable order. A user can place a first tag on a first personal effect, as in box 400. A signal from the first tag is associated with or at a controlling, or monitoring, device 405. A second tag corresponding to a second personal effect is registered with the first tag as shown in 410. In this implementation, the second tag is optionally registered with the controlling or monitoring device. Boxes 415 and 420 indicate that the locations of the first and second personal effects should be monitored periodically.

FIG. 5 shows an implementation of a method of monitoring the location and status of a personal effect that is attached to a location and status monitoring lock. The following portions of such an implementation can take place in any suitable order. A user attaches the lock to a personal effect, as shown in 500. Box 505 indicates associating or otherwise registering the signal from the lock with the controlling or monitoring device or system. In 510, the lock can perform an assessment of its own starting state, such as a locked or unlocked state. Box 515 indicates monitoring of the location and state of the lock while the attached personal effect is away from the user, that is to say out of sight of or reach of the user. Additionally, box 520 indicates that the lock can report any change in the state of the personal effect or effects upon return to the user, including any changes in weight (i.e. mass) or if there have been an excessive number of unlocking events.

FIG. 6 shows an implementation of a method of monitoring the location and status of a piece of luggage surrounding or encasing personal effects. Box 605 indicates that a user associates or registers the signal from the luggage with the monitoring device or system (i.e. controlling device). Subsequently, the luggage assesses and reports and/or records its starting state in 610. Box 615 indicates a periodic monitoring of the location and/or state of the luggage while the luggage is away from the user. In this implementation, the luggage may be optionally used to monitor signals from other location and status monitoring devices having signaling capabilities. Step 620 indicates that the final step is to assess and/or report the state of the luggage upon return to the user, including any changes in weight (i.e. mass) or an excessive number of unlocking events. This assessment may include other status events or changes. The times and locations of such changes may also be reported. The foregoing can occur in any suitable order.

Figure 7:
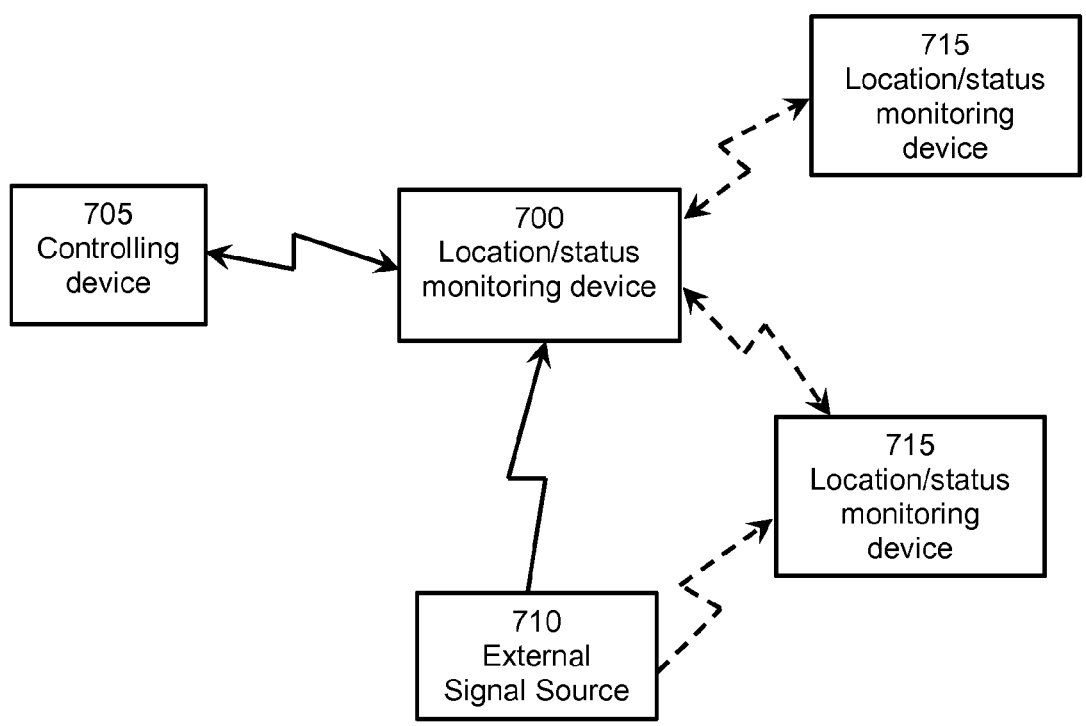
FIG. 7 shows an exemplary interaction between a location and status monitoring tag, lock, or luggage, a controlling device, and an external signal source.

FIG. 7 is a schematic diagram showing the communication pathways that may exist in an implementation of a location and status monitoring system. In the implementation shown, a location and status monitoring device 700 such as a tag, lock, or luggage that may be associated with a personal effect may communicate in a reciprocal manner with a monitoring or controlling device 705. The type of information passed from the monitoring or controlling device 705 to the location and status monitoring device 700 includes instructions to lock or unlock and a threshold distance or radius between the controlling device 705 and the location and status monitoring device 700 that is associated with a personal effect. The location and status monitoring device 700 passes information regarding location and/or status to the controlling device 705. Location or proximity information that passes from the location and status monitoring device 700 to the controlling device 705 has some basis in information obtained in communication between an external data source 710 and the location and status monitoring device 700. As mentioned above, the location and status monitoring device 700 may communicate with additional location and status monitoring devices 715 that may be associated with respective additional personal effects. If present, these additional location and status monitoring devices 715 communicate with the external data source 710 and may directly provide information to the controlling device 705. Alternatively, the additional location and status monitoring devices 715 may communicate with the controlling device 705 via the location and status monitoring device 700.

User Interface for Tags, Locks, and Luggage

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In some implementations, a user interface in at least one of the controlling device and the location and status monitoring device may provide notifications to the user of a change in the environment (e.g. geolocation, temperature, etc.) reported from a location, control, and status monitoring device, or in the status or configuration of luggage associated with the location and status monitoring device (e.g. locked, unlocked, items removed or added, etc.). The notification may be a visual signal, such as one or more LEDs or other light source. Multiple light sources may be used that flash in a specified sequence, multiple light colors, or the one or more light sources may modulate their intensity depending on the notification that needs to be communicated to the user. In some implementations, the notification may be an audio signal. The audio signal may be one or more audible, ultrasonic, or subsonic frequencies. The audio signal may vary in amplitude or duration. In some implementations, the sonic frequencies emitted may be a representation or recording of a human voice, an animal sound, such as a dog bark, or some other recorded sound. In some implementations, the notification may be a tactile or haptic signal. The amplitude, timing, and duration of the haptic signal can be varied to indicate to a user the nature of the notification. The haptic signals can include vibrations as well as direct electric discharge. Direct electric discharge can be a low current discharge that is detected on the skin, or a higher discharge that causes physical discomfort. Haptic actuators can include, but are not limited to, vibrating motors, electrically conductive surfaces coupled with a charge creator, subsonic sound waves, electroactive polymers, piezoelectric actuators, electrovibration actuators (e.g. indirect charge actuators such as TeslaTouch™) and the like. Electroactive polymers (EAPs) may be used to cause deformities in a surface (e.g. protrusions or depressions) following application of a voltage difference across the electroactive polymer. The electroactive polymers may be: dielectric EAPs, such as ferroelectric EAPs (e.g. polyvinylidene fluoride); electrostrictive graft polymers; or liquid crystal polymers. The EAPs can also be ionic EAPs, such as an electrorheologic fluid or an ionic polymer-metal composite. An ionic EAP may be coated with a waterproof polymer that can deform along with the ionic EAP to produce a deformity that can be detected by touch or even sight. Ionic EAPs require less voltage to deform.

In some implementations, notifications by a user interface of at least one of a controlling device and a location and status monitoring device may act as a warning to a person attempting to move or open luggage having a location and status monitoring device, or to remove the location and status monitoring device from the luggage. Bright light, high volume sounds such as alarm or voice, and mild electric shock may be emitted from a tag user interface as a response to stimulus that is undesirable, such as removal of the location and status monitoring device from the luggage, movement outside of a pre-defined area, opening of the luggage, etc.

A user interface in at least one of the controlling device and the location and status monitoring device may have a visual display to provide notifications or warnings to a person. The display can be electronic paper (e-paper) or cholesteric LCD with a low power requirement to change and/or maintain an image. The display can also be made of a thin, flexible plastic to give the display some resiliency to movement and a thin profile. In some implementations, the user interface may include passive-matrix or active-matrix organic LED displays, thin film polymer LED displays (e.g. poly(p-phenylene vinylene)), quantum dot displays, LCD displays (e.g. transreflective or backlit LCDs), interferometric modulator displays (e.g. Mirasol™), and the like. In some implementations, the visual display is flexible. The display may be configured to show a scannable one-dimensional, two-dimensional, or three-dimensional data block.

The user interface of the controlling device and/or location and status monitoring device may also be configured to accept input from a user. The tag user interface may have a touchscreen display, including but not limited to a capacitive touchscreen, a surface acoustic wave touchscreen, an acoustic pulse recognition touchscreen, a piezoelectric touchscreen, and an infrared or optical touchscreen. The tag user interface may include buttons, that allow for notifications and warnings to be stopped or reset, as well as alphanumeric symbols to be input to the tag. The user interface for a location and status monitoring device can also include a keyhole configured to receive a physical key. Turning of the key can turn on, turn off, or reset notifications or warnings coming from the interface. The user interface for the location and status monitoring device may include a microphone that can receive a range of audio frequencies, such as a voice or one or more specific sound frequencies, and analyze the incoming sounds via a processor to match the sound to a predetermined "key" sound or sequence of sounds. The user interface may include a camera that can image and detect one-dimensional, two-dimensional, or three-dimensional data blocks containing information, as well as biometric information, such as fingerprint, iris, or blood vessel patterns.

In some implementations, the user interface of the controlling device and/or location and status monitoring device may cause wireless transmission of signals and data to one or more devices. For example, if a location and status monitoring device associated with tag or luggage detects that it is within a specified geolocal area, the tag or luggage can send a wireless signal to an external device in the form of an SMS text message, a voice call, an email, or other electronic data communication alerting a user that the tagged luggage is within the specified geolocal area. Exemplary wireless communications technologies include cell phone data transfer protocols (e.g. 3G, 4G), Bluetooth® (such as Bluetooth low energy, or BLE, also known as Bluetooth® Smart), ANT+, radio-frequency identification (RFID), products that are based on the Institute of Electrical and Electronics Engineers' (IEEE) 802.11 standards (WiFi), wireless local area network devices (including ad hoc or mesh networks), IrDA (infrared data association), ZigBee® (communications based upon IEEE 802 standard for personal area networks), Z-wave, wireless USB, or the like.

Safety and Security Features

Tags, locks, and luggage incorporating the presently disclosed technology incorporate a number of safety features to allow a user to monitor safe handling of luggage, the chain of custody of the luggage, and aid in preventing loss of personal items. For example, safe-handling parameters of the luggage may be monitored to ensure that the luggage has not been subjected to undue force or undesirable environments, such as extreme temperatures or pressures, during transport. A safe handling parameter also includes whether the luggage has been opened or tampered with during transport.

A user may wish to completely protect his or her personal effect in a container that is itself a location and status monitoring device. An example of this would be a suitcase or luggage that is able to protect the personal effect from unwanted perturbation and which could relay information regarding location, locked/unlocked status switching, and other environmental factors. Other environmental factors include temperature extremes, sudden inertial change (i.e. being dropped or thrown), excessive pressure (e.g. being placed beneath a heavy object), excessive humidity or dryness, changes in mass of the luggage, and the like. To monitor such environmental factors, a location and status monitoring device may include sensors such as temperature sensors, altitude sensors, accelerometers, humidity sensors, pressure sensors, and/or times, and the device may include a memory to log the readings from these sensors.

In certain implementations, tags, locks, and luggage incorporating the presently disclosed technology can store data related to safe handling parameters that is detected by sensors associated with the tags, locks, or luggage. For example, data from a given sensor can include timestamp information (e.g. the time and/or date that data was taken in by a sensor) associated with the data to aid in analysis of the data. Geolocation data obtained periodically, such as from a GPS receiver, may be stored with timestamp information to allow later determination as to the geolocation of the luggage at various times during luggage transport. Data from a variety of other environmental sensors along with a timestamp may also be stored, such as temperature, humidity, barometric pressure, levels of gases (e.g. carbon dioxide, methane, etc.), biological hazards or by-products (e.g. bacteria, viruses, fungi, pollen, aerosolized protein, etc.), levels of radiation (e.g. from a dosimeter or Geiger counter), damage to the luggage (e.g. impact, crushing, or excessive strain), and the physical state of the luggage (e.g. picking up or setting down luggage, items removed or added to the luggage, etc.).

In some implementations, data relating to the chain of custody can be stored with or without timestamps. For example, biometric data obtained from a biometric sensor (e.g. a scan of a fingerprint, iris, retina, blood vessel pattern, voice or face patterns; or detection of one or more particular nucleic acid sequences) may be stored. Stored biometric information obtained from one or more biometric sensors can be compared with a stored biometric profile of one or more authorized users to determine whether only authorized users had handled or opened the luggage. Biometric data from unauthorized users who use the one or more biometric sensors may also be stored. In some implementations, a photograph of the person opening the luggage is taken automatically, and the photograph is stored by the tag, lock, or luggage. In certain implementations, a photograph is taken only when the luggage has been opened without using a key or biometric feature to gain access.

In some implementations, data regarding the proximity and/or relative locations of multiple pieces of luggage is stored by one or more location and status monitoring devices or by a controlling device. For example, location/status devices may attempt to establish links with each other and/or a controlling device in periodic intervals. Both the successful and unsuccessful linkage attempts with other location/status devices can be timestamped and stored. Similarly, activation of an alarm or signal that alerts a user to a piece of luggage that cannot be located can be recorded and timestamped and stored by a location/status device or by a controlling device.

In some implementations of the instant technology, a lock attached to the luggage may be mechanically engaged by closing the lid or opening of the luggage by hand. In some implementations, the lock can be engaged and disengaged electronically, and remotely. For example, the lock can engage and lock the lid or opening of the luggage when the lid or luggage opening is closed and a signal is sent to the lock that results in the lock being engaged. For example, the lid or luggage opening may include a pair of electrically conductive materials that complete a circuit when the lid is closed, the detection of which results in engaging the electronic lock. In some implementations, a transmitted signal from a controlling device can be sent to the electronic lock and cause it to engage. In some implementations, a continuous signal sent by a control device or another tag maintains the lock in an unlocked or disengaged state; when the continuous signal is interrupted, the lock engages automatically. In certain implementations, the electronic lock engages or disengages after receiving a signal from a timer with a pre-set amount of time or a clock that sends a signal to the lock at a specific time of day. In certain implementations, the location and status monitoring device may detect the geolocation of the luggage, and signal the electronic lock to engage or disengage when the luggage is at a predetermined location or within a predetermined geolocation area. In some implementations, the electronic lock may be signaled to engage and secure the luggage when rotation of the wheels is detected. The luggage can be secured by preventing the wheels from rotating, preventing access to luggage handles, as well as preventing the lid or opening of the luggage from being opened.

In certain implementations, the lock is engaged or disengaged according to signals from one or more location and status monitoring devices or biometric scanning devices associated with the luggage that fall within predefined parameters. For example, an electronic lock on luggage of the presently disclosed technology can be engaged or disengaged by detecting a biometric feature of a user. The detected biometric feature is compared to a feature stored in a memory in the lock, in the luggage, or in a controlling device. In another example, an input device associated with the electronic lock, such as a keypad or touchscreen may be associated with the electronic lock. Input of a correct symbol sequence or movement sequence via the input device can engage or disengage the electronic lock. In yet another example, a token may be used to authenticate the user and engage and disengage the electronic lock. The token may be a small device with a display that present a code or shape for the user to enter on the luggage or it may connect to the electronic lock through either a wired or wireless connection (e.g. USB, 3.5 mm jack connection, Bluetooth®, etc.). In some implementations, the token can be a mobile electronic device, such as a smartphone or tablet.

In certain implementations, a combination of at least two of the above methods may be used to enable authentication of an authorized user to engage or disengage the electronic lock. For example, in order to engage or disengage the electronic lock, a biometric scanner associated with the luggage must be used to detect an authorized user, in addition to entry of a proper symbol or shape sequence via the input device. In certain implementations, an authorized token, such as a USB device or RFID chip, must be properly authenticated, in addition to entry of a proper symbol or shape sequence in order for the electronic lock on the luggage to be engaged or disengaged. In certain implementations, engaging or disengaging the electronic lock requires authentication of both an authorized token, such as a USB device or RFID chip as well as proper user authentication by a biometric scanning feature. In certain implementations, engaging or disengaging the electronic lock requires proper user authentication by a biometric scanning feature, as well as proper input to an input device. In some implementations, engaging and disengaging of the electronic device requires biometric feature scanning, proper input of symbol or shape sequence into an input device, and the presence of a proper token, e.g. a USB device or smartphone.

In some implementations, the electronic lock is engaged or disengaged in response to a signal from a mobile electronic device, e.g., a control device. The mobile device can act as a token for multi-factor authentication, in combination with biometric or sequence input to the luggage as described above. For example, a wired or wireless signal from a mobile electronic device can provide one or more lock or unlock codes to the electronic lock and engage or disengage, respectively, the electronic lock. The lock and unlock codes may be entered by a user of the mobile electronic device or are stored by a program in the memory of the mobile device. In some implementations, the lock may require multiple codes, with at least two code signals coming from two different mobile devices. In some implementations, the user identity is confirmed via a biometric scanner associated with or integrated with the mobile electronic device in addition to entry of a code in the mobile device. In certain implementations, more than one mobile device and more than one user may be required to disable or enable an electronic lock on the luggage.

In some implementations of the present technology, the luggage has at least one retractable handle and at least two wheels to facilitate handling of the luggage. The wheels and handle are associated with electromechanical actuators that can withdraw and extend the wheels and handle into the luggage in response to movement, changes in geolocation, changes in environment, or a predetermined number of failed attempts to disengage the electronic lock.

Environmental Survival

Tags, locks, and luggage having a location and status monitoring device may be constructed from materials that protect the tag, lock, or luggage from environmental damage. Tags, locks, and luggage may be constructed from ballistic materials that inhibit penetration from projectiles, or impact by sharp objects. Exemplary ballistic materials include ballistic fabrics (e.g. ballistic nylons, para-aramid fibers), ballistic plastics and polymers, ballistic laminates (including combinations of ballistic plastics/polymers and ballistic fabrics and fibers, e.g. para-aramid fibers or nanotubes of carbon or tungsten disulfide), ceramic plates (e.g. boron carbide), and metal (e.g. steel, titanium).

Tags, locks, and luggage of the present technology may also be constructed from self-healing materials, such as polymers that self-heal upon exposure to heat (e.g. furan-meleimides), or polymers capable of autonomic healing. In autonomic healing, tubes or capsules on a micro- or nanoscale are formed in a polymer and filled with a monomer capable of reacting with the polymer. When the tubes or capsules are broken due to physical stress, the monomer is released and interacts with the polymer (and possibly a catalyst) to heal the damaged area (e.g. dicyclopentadiene encapsulated in epoxy resin containing Grubb's catalyst).

Tags, locks, and luggage of the instant technology can also be constructed of materials that are waterproof (e.g. polytetrafluoroethylene, metal, rubber, silicone, vinyl), or coated with a waterproof coating (e.g. vinyl, rubber, polyvinylchloride, polyurethane, silicone elastomer, fluoropolymers such as polytetrafluoroethylene, SympaTex™ membrane, or wax). The materials may also be coated or treated with antimicrobial and/or antifungal compounds, such as silver or copper nanoparticles, carbon nanoparticles, triclosan, silane quaternary ammonium compounds, and zinc pyrithione.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and/or Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, as would, for example, a non-transient solid-state memory or a magnetic hard drive or any equivalent storage medium.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A tag for a luggage having a securing mechanism to secure the luggage, the tag comprising:
   a locking mechanism for attaching to the securing mechanism of the luggage, the locking mechanism including an actuator, wherein the luggage includes an automatically extendable handle and the securing mechanism includes a handle lock, and wherein the actuator is configured to unlock the handle lock based on receipt of a control signal thereby permitting the handle to automatically extend;
   one or more data inputs to receive data from corresponding one or more data sources associated with the luggage;
   one or more control outputs to output the control signal to the actuator;
   at least one wireless communication module for wireless data communication with at least one external controller;
   a non-transient storage device storing instructions; and
   a processor responsive to the instructions to:
      receive the data from the one or more data inputs;
      generate the control signal for the one or more control outputs; and
      generate the wireless data communication for the at least one wireless communication module based on the data from the one or more data sources and/or the control signal from the one or more control outputs.

2. The tag in accordance with claim 1, wherein the luggage includes a compartment and the securing mechanism includes an engagement mechanism, and wherein the actuator is configured to lock and/or unlock the engagement mechanism based on the control signal.

3. The tag in accordance with claim 1, wherein the luggage includes at least one wheel and the securing mechanism includes a wheel stop, and wherein the actuator is configured to lock and/or unlock the wheel stop based on the control signal.

4. The tag in accordance with claim 1, wherein the at least one wireless communication module is configured to receive an external control signal from the at least one external controller, and wherein the actuator of the locking mechanism of the tag is responsive to the external control signal.

5. The tag in accordance with claim 1, wherein the one or more data sources associated with the luggage include one or more environmental sensors.

6. The tag in accordance with claim 5, wherein the one or more environmental sensors is selected from the group of environmental sensors that consists of: a temperature sensor, a humidity sensor, a moisture sensor, a light sensor, a velocity sensor, a movement sensor, an accelerometer, an air pressure sensor, a camera and/or a microphone.

7. The tag in accordance with claim 1, wherein the wireless data communication by the at least one wireless communication module includes a notification representing a change in state of the data from the one or more data sources.

8. The tag in accordance with claim 7, wherein the notification includes an alert formatted for the at least one external controller.

9. The tag in accordance with claim 1, further comprising a housing to house at least part of the one or more data inputs, at least part of the one or more control outputs, the at least one wireless communication module, the non-transient storage device storing instructions, and the processor.

* * * * *